(12) United States Patent  
Ahn

(10) Patent No.: US 12,199,434 B2  
(45) Date of Patent: Jan. 14, 2025

(54) POWER MANAGEMENT DEVICE

(71) Applicants: Hyundai Motor Company, Seoul (KR); Kia Corporation, Seoul (KR)

(72) Inventor: Seong Chul Ahn, Suwon-si (KR)

(73) Assignees: Hyundai Motor Company (KR); Kia Corporation (KR)

( * ) Notice: Subject to any disclaimer, the term of this patent is extended or adjusted under 35 U.S.C. 154(b) by 16 days.

(21) Appl. No.: 18/077,397

(22) Filed: Dec. 8, 2022

(65) Prior Publication Data

US 2023/0327447 A1    Oct. 12, 2023

(30) Foreign Application Priority Data

Apr. 7, 2022   (KR) .................. 10-2022-0043434

(51) Int. Cl.
| | | |
|---|---|---|
| *H02J 3/32* | (2006.01) | |
| *H02J 3/00* | (2006.01) | |
| *H02J 3/01* | (2006.01) | |
| *H02J 7/00* | (2006.01) | |
| *H02J 7/06* | (2006.01) | |

(Continued)

(52) U.S. Cl.
CPC ............ *H02J 3/32* (2013.01); *H02J 3/001* (2020.01); *H02J 3/01* (2013.01); *H02J 7/0047* (2013.01); *H02J 7/06* (2013.01); *H02J 7/345* (2013.01); *H02M 5/2932* (2021.05)

(58) Field of Classification Search
CPC ...... H02J 3/32; H02J 3/001; H02J 3/01; H02J 7/0047; H02J 7/06; H02J 7/345; H02J 2207/50; H02M 5/2932; H02M 1/0048; H02M 1/007; H02M 1/32; H02M 5/4585; H02M 1/0064; Y04S 10/30
See application file for complete search history.

(56) References Cited

U.S. PATENT DOCUMENTS

| | | | |
|---|---|---|---|
| 2015/0032281 A1 | 1/2015 | Kim et al. | |
| 2017/0070074 A1* | 3/2017 | Sugeno | H02J 9/062 |
| 2022/0216726 A1* | 7/2022 | Kamalasadan | H02J 7/0063 |

FOREIGN PATENT DOCUMENTS

| | | |
|---|---|---|
| CN | 108075491 A | 5/2018 |
| JP | 2011193685 A | 9/2011 |
| KR | 100333090 B1 | 4/2002 |

(Continued)

OTHER PUBLICATIONS

Kim, "Stabilization technology plan using ESS," Oct. 2014, 100 pages.

*Primary Examiner* — Lincoln D Donovan  
*Assistant Examiner* — Alex W Lam  
(74) *Attorney, Agent, or Firm* — Fish & Richardson P.C.

(57) ABSTRACT

Disclosed is a power management device configured to stably supply power and save power by managing power quality includes a first switch, a converter, a voltage detector, a current detector, and a processor configured to control power of the power source to be supplied to the load through the first switch by turning the first switch on in an echo compensation mode, monitor power quality based on the detected current and the detected voltage, and when it is determined that the power quality has been abnormal, perform compensation control through the converter in a turned-on state of the first switch or control the power of the power source to be supplied to the load through the converter by turning the first switch off.

19 Claims, 15 Drawing Sheets

(51) Int. Cl.
*H02J 7/34* (2006.01)
*H02M 5/293* (2006.01)

(56) References Cited

FOREIGN PATENT DOCUMENTS

| | | |
|---|---|---|
| KR | 101124014 B1 | 3/2012 |
| KR | 20150090371 A | 8/2015 |
| KR | 20200098924 A | 8/2020 |
| KR | 102260937 B1 | 6/2021 |

* cited by examiner

POWER MANAGEMENT DEVICE

CROSS-REFERENCE TO RELATED APPLICATION

This application claims the benefit of Korean Patent Application No. 10-2022-0043434, filed on Apr. 7, 2022, in the Korean Intellectual Property Office, the disclosure of which is incorporated herein by reference.

TECHNICAL FIELD

The present disclosure is related to a power management device configured to stably supply power and save power by managing power quality.

BACKGROUND

Conventional renewable energy power generators such as photovoltaic and wind power generators have disadvantages in that power may not be steadily obtained depending on changes in weather and the stability of power production is poor. To solve the problem, the power generated from the renewable energy power generators may be stored in an energy storage system (ESS) and the stored power may be used in a required time zone.

The ESS may be operated independently, but may also be operated in combination with the renewable energy power generators. For example, the ESS may be applied to an independent power generation system that only operates independently like the renewable energy power generators and may also be applied to a grid-connected power generation system that operates in connection with the renewable energy power generators and commercial power systems.

The ESS, the renewable energy power generators, and the grid-connected power generation system include a power management device configured to convert a magnitude or frequency of power, current, and voltage and supply the converted power, current, and voltage to various loads.

There is a need for techniques for managing qualities of power, current, and voltage in order to prevent malfunction or fault of loads (electrical machine and the like), insulation breakdown, deletion of memory data, shutdown or reset, overheating, and the like when power is supplied to the loads.

SUMMARY

Therefore, it is one aspect of the present disclosure to provide a power management device configured to supply power with improved power quality to loads in response to an online compensation mode and directly supply power of a power source to the loads in response to a fault state while the online compensation mode is performed.

It is another aspect of the present disclosure to provide a power management device configured to monitor the quality of power supplied from a power source at the same time as directly supplying power of a power source to loads in response to an echo compensation mode and supply power with improve power quality to the loads by performing compensation control when the power quality is abnormal.

It is still another aspect of the present disclosure to provide a power management device configured to control charging and discharging of a battery in response to the abnormality of the power quality with respect to an instantaneous voltage sag or an instantaneous voltage swell.

In accordance with one aspect of the present disclosure, a power management device includes a first switch provided between a power source and a load, a converter connected to the first switch in parallel and configured to convert a voltage and a current received from the power source, a voltage detector configured to detect the voltage supplied from the power source, a current detector configured to detect the current supplied from the power source, and a processor configured to control power of the power source to be supplied to the load through the first switch by turning the first switch on in an echo compensation mode, monitor power quality based on the detected current and the detected voltage, and when it is determined that the power quality has been abnormal, perform compensation control through the converter in a turned-on state of the first switch or control the power of the power source to be supplied to the load through the converter by turning the first switch off.

The power management device according to one aspect may further include a second switch connected between the power source and the converter and a third switch connected between the load and the converter. The converter of the power management device according to one aspect may include a first converter configured to convert the voltage and the current supplied from the power source into a DC voltage and a DC current and a second converter provided between the first converter and the second switch and configured to convert the DC voltage and the DC current converted by the first converter into an AC voltage and an AC current.

The converter of the power management device according to one aspect may include a first converter connected to the second switch and configured to convert power of the power source into DC power and a second converter provided between the first converter and the second switch and configured to convert the DC power converted by the first converter into AC power.

The processor of the power management device according to one aspect may control the power of the power source to be supplied to the load through the converter by turning the first switch off in an online compensation mode, monitor the power quality based on the detected current and the detected voltage while performing the online compensation mode, and perform the compensation control for the power quality based on monitored information.

When it is determined that a fault of at least one of the second and third switches and the first and second converters has occurred while the online compensation mode is performed, the processor of the power management device according to one aspect may control the power of the power source to be supplied to the load through the first switch by turning the first switch on.

The processor of the power management device according to one aspect may monitor a voltage sag, a voltage swell, a voltage unbalance, harmonics, and a power factor upon monitoring the power quality, perform the compensation control through the first and second converters by turning the second and third switches on in the turned-on state of the first switch when it is determined that the power quality with respect to at least one of the harmonics, the voltage unbalance, and the power factor has been abnormal while the echo compensation mode is performed, and control the power of the power source to be supplied to the load through the first and second converters by turning the first switch off and turning the second and third switches on when it is determined that the power quality with respect to the voltage sag or the voltage swell has been abnormal.

The power management device according to one aspect may further includes a DC link provided between the first converter and the second converter and including a capacitor. The processor of the power management device according to one aspect may control discharging of the capacitor when abnormality of the power quality is the voltage sag and control charging of the capacitor when the abnormality of the power quality is the voltage swell.

The power management device according to one aspect may further include a fourth switch connected to an energy storage system including a battery and a third converter connected to the fourth switch, the first converter, and the second converter. The processor of the power management device according to one aspect may control the power of the power source to be supplied to the battery through the first converter and the third converter by turning the fourth switch on when a charged amount of the battery is smaller than a reference charged amount and control power of the battery to be supplied to the load through the third converter and the second converter by turning the fourth switch on when a current electric fee is a maximum electric fee.

The processor of the power management device according to one aspect may control the power of the battery to be supplied to the second converter by control the turn-on of the fourth switch when abnormality of the power quality is the voltage sag and control power of the first converter to be supplied to the battery by controlling the turn-on of the fourth switch when the abnormality of the power quality is the voltage swell.

The power management device according to one aspect may further include a first filter provided between the power source and the first converter and including an inductor-capacitor-inductor (LCL) filter and a second filter provided between the second converter and the load and including an inductor-capacitor (LC) filter.

In accordance with another aspect of the present disclosure, a power management device includes an input device, a first switch provided between a power source and a load, a converter connected to the first switch in parallel and configured to convert a voltage and a current received from the power source, and a processor configured to control power of the power source to be supplied to the load through the first switch by turning the first switch on when a compensation mode received through the input device is an echo compensation mode and control the power of the power source to be supplied to the load through the converter by turning the first switch off when the compensation mode received through the input device is an online compensation mode.

The power management device according to another aspect may further include a voltage detector configured to detect the voltage supplied from the power source and a current detector configured to detect the current supplied from the power source. The processor of the power management device according to another aspect may monitor power quality based on the detected current and the detected voltage while performing the echo compensation mode, and when it is determined that the power quality has been abnormal, perform compensation control through the converter in a turned-on state of the first switch or control the power of the power source to be supplied to the load through the converter by turning the first switch off.

The power management device according to another aspect may further include a second switch provided between the power source and the converter, a third switch provided between the converter and the load, a first filter connected to the second switch and including an LCL filter, and a second filter connected to the third switch and including an LC filter. The converter of the power management device according to another aspect may include a first converter connected to the second switch and configured to convert the voltage and the current supplied from the power source into a DC voltage and a DC current and a second converter provided between the first converter and the second switch and configured to convert the DC voltage and the DC current converted by the first converter into an AC voltage and an AC current.

The processor of the power management device according to another aspect may monitor the power quality based on the detected current and the detected voltage and perform the compensation control based on monitored information.

When it is determined that at least one of the second and third switches and the first and second converters is in a fault state while the online compensation mode is performed, the processor may control the power of the power source to be supplied to the load through the first switch by turning the first switch on.

The power management device according to another aspect may further include a fourth switch connected to an energy storage system including a battery and a third converter connected to the fourth switch, the first converter, and the second converter. The processor of the power management device according to another aspect may control the power of the power source to be supplied to the battery through the first converter and the third converter by turning the fourth switch on when a charged amount of the battery is smaller than a reference charged amount and control power of the battery to be supplied to the load through the third converter and the second converter by turning the fourth switch on when a current electric fee is a maximum electric fee.

The processor of the power management device according to another aspect may control the power of the battery to be supplied to the second converter by turning the fourth switch on when abnormality of the power quality is a voltage sag and control power of the first converter to be supplied to the battery by turning the fourth switch on when the abnormality of the power quality is a voltage swell.

In accordance with still another aspect of the present disclosure, a power management device includes a converter connected to a power source and configured to convert a voltage and a current received from the power source, a switch connected to an energy storage system including a battery, a voltage detector configured to detect the voltage supplied from the power source, and a processor configured to determine whether a state of the power input to the power management device is a voltage sag state or a voltage swell state based on the detected voltage, control power of the battery to be supplied to the converter by turning the switch on when it is determined that the state of the power input to the power management device is the voltage sag state, and control power of the power source to be supplied to the battery through the converter by turning the switch on when it is determined that the state of the power input to the power management device is the voltage swell state.

The processor of the power management device according to still another aspect may control the power of the power source to be supplied to the battery through the converter by turning the switch on when a charged amount of the battery is smaller than a reference charged amount and control the power of the battery to be supplied to the converter by turning the switch on when a current electric fee is a maximum electric fee.

The power management device according to still another aspect may further include a current detector configured to detect the current supplied from the power source. The processor of the power management device according to still another aspect may monitor harmonics, a power factor, and a voltage unbalance based on the detected current and the detected voltage and control the converter based on monitored information.

The power management device according to still another aspect may further include a first switch provided between the power source and the load and connected to the converter in parallel, a first filter provided between the power source and the converter and including an LCL filter, a second filter provided between the converter and the load and including an LC filter, a second switch provided between the first filter and the converter, and a third switch provided between the second filter and the load. The power of the power source may be supplied to the load through the first switch when the first switch of the power management device according to still another aspect is turned on, and the power of the power source may be supplied to the load through a path connecting the second switch, the first filter, the converter, the second filter, and the third switch when the first switch is turned off.

DETAILED DESCRIPTION

Figure 1A:
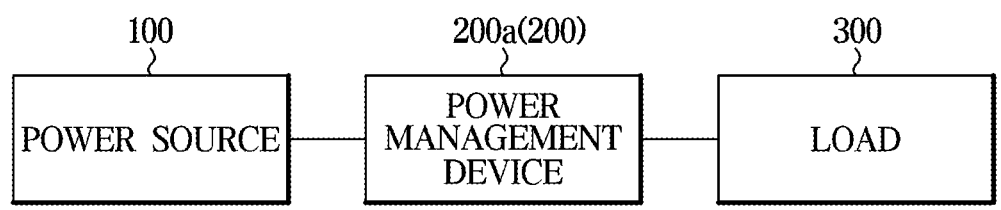
FIG. 1A is a diagram illustrating an example of a power system.

FIG. 1A is a diagram illustrating an example of a power system.

As shown in FIG. 1A, a power system 1 may include a power source 100, a power management device 200a, and a load 300.

The power source 100 may include a renewable energy power generator, such as a photovoltaic power generator and a wind power generator.

For example, the photovoltaic power generation is a power generation method of directly converting light into electrical energy (referred to as power) using a solar cell.

More specifically, in the photovoltaic power generation, the solar cell receives light to generate DC power, converts the DC power generated from the solar cell into AC power of a commercial frequency through an inverter, and then transmits the converted AC power through a power line.

The power source 100 may supply AC power of about 440 V to the power management device 200a.

The power source 100 may also include a commercial power system and a renewable energy power generator. Here, the commercial power system may be a conventional energy power generator, such as thermal power generation, hydroelectric power generation, and nuclear power generation.

The power management device 200a may receive the power of about 440 V from the power source 100.

The power management device 200a may also convert power generated from a renewable energy power generator into a power, voltage, or current required by the load 300 and supply the converted power, voltage, or current to the load 300.

The power management device 200a may convert power generated from the commercial power system into a power, voltage, or current required by the load 300 and supply the converted power, voltage, or current to the load 300.

The power management device 200a can minimize power loss occurring in a process of converting present power into power having other components and thus manage power quality in order to supply more power to the load 300.

The power having other components may include AC power and DC power.

The power management device 200a may store reference data, which is a reference of various power qualities, determine various power qualities based on various types of reference data, voltage data detected through a voltage detector, and current data detected through the current detector, and then control the power to be turned on or off and power conversion in the power management device based on compensation data for compensating various types of power qualities.

For example, the power management device 200a may manage power qualities related to an adjustable speed drive (ASD), a switching mode power supply, an arc furnace, and the like, current qualities affecting voltage distortion due to harmonics, power factor (PF), and current distortion, and voltage qualities such as a voltage sag and swell, under and over voltages, interruption, noise, and other factors (DC offset, harmonics, interharmonics, and notching), voltage imbalance, and voltage fluctuation and flicker.

The power management device 200a may stably supply power to the load 300, secure the reliability of a power grid, prevent power generation of a commercial power system or a renewable energy generator from being stopped, prevent a fault of the load 300, and improve the power saving by managing the qualities of power, voltage, and current.

The power management device 200a may change a path of the power supply by controlling an operation of at least one switch in response to at least one of a compensation mode and a fault state.

The load 300 is a device configured to consume power and may include one electrical device or two or more electrical devices. Two or more electrical devices may be connected in parallel with each other.

A plurality of power management devices 200a of the power system may be provided. In this case, the power system may be operated by synchronizing the plurality of power management devices 200a.

The plurality of power management devices 200a may be connected in parallel with each other between the power source and the load.

One of the plurality of power management devices 200a may be set to a master device, and the rest may be set to slave devices.

The slave devices may be controlled by the master device.

The master device may synchronously control the slave devices based on a current signal, a voltage signal, and a frequency. Therefore, it is possible to minimize damage by flexibly responding to a capacity required in the field and taking prompt action in the event of a fault.

Figure 1B:
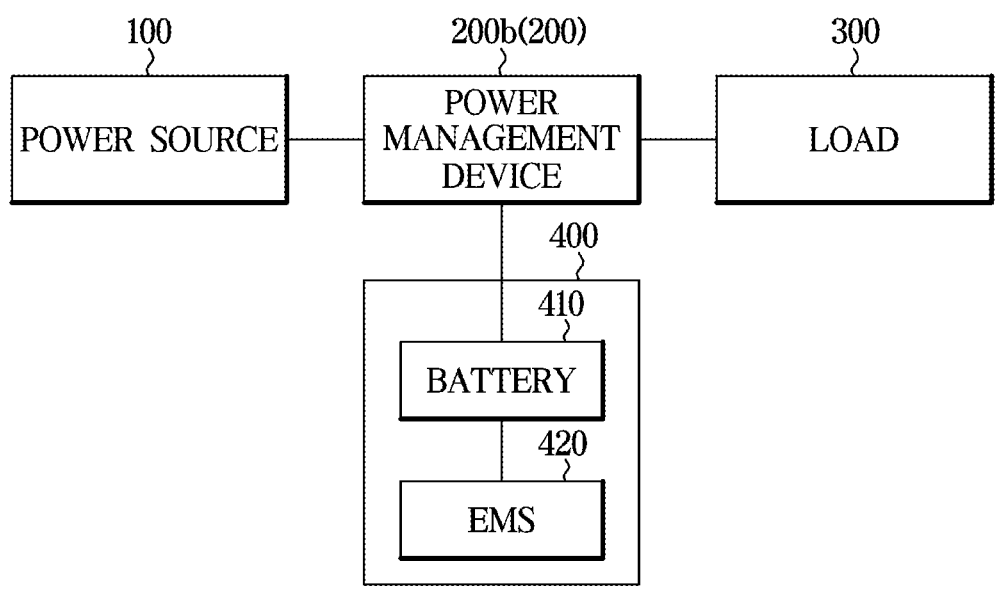
FIG. 1B is a block diagram illustrating an example of a power system.

FIG. 1B is a diagram illustrating another example of a power system.

As shown in FIG. 1B, the power system may include a power source 100, a power management device 200b, a load 300, and an energy storage system 400.

Another example of a power system is referred to as a hybrid power system.

The power source 100 may include a renewable energy power generator, such as photovoltaic power generation and wind power generation.

The power source 100 may also include a commercial power system and a renewable energy power generator.

Since the power source 100 is the same as the power source 100 in FIG. 1A, a detailed description thereof will be omitted.

The load 300 is a device configured to consume power and may include one electrical device or two or more electrical devices. Two or more electrical devices may be connected in parallel with each other. Since the load 300 is the same as the load 300 in FIG. 1A, a detailed description thereof will be omitted.

The power management device 200b may control conversion of power to be supplied to the energy storage system 400 in addition to a configuration of the power management device 200a in FIG. 1A.

The power management device 200b may compensate for a voltage sag and a voltage swell using power of a battery 410 of the energy storage system 400 and prevent voltage imbalance.

The power management device 200b may turn power of the energy storage system 400 on or off, convert the power, and transmit the converted power through a power line.

The power management device 200b may control an output by converting AC power into DC power when the battery 410 is charged and converting the DC power into the AC power when the battery 410 is discharged.

The energy storage system 400 may be applied to a renewable energy technique or a smart grid technique.

The energy storage system 400 may store the power supplied from the power management device 200b and supply the stored power to the power management device 200b in response to the control of the power management device 200b.

The energy storage system 400 may include a plurality of battery racks connected in parallel and an energy management system (EMS) 420 configured to manage and control the plurality of battery racks.

The EMS 420 may transmit rack monitoring information, such as a state of charge (SoC) and life state of each battery rack, to the power management device 200b.

Each battery rack may include a plurality of battery modules connected in series and in parallel, and each battery module may include a plurality of battery cells connected in series and in parallel.

The EMS 420 may monitor and control the battery cells, the battery modules, and states of the battery cells.

The battery racks may be referred to as batteries, the battery modules may be referred to as the batteries, and the battery cells may be referred to as the batteries.

The battery 410 may be charged and discharged.

A plurality of power management devices 200b of the power system may be provided. In this case, the power system may be operated by synchronizing the plurality of power management devices 200b.

The plurality of power management devices 200b may be connected in parallel with each other between the power source and the load.

One of the plurality of power management devices may be set to a master device, and the rest may be set to slave devices.

The slave devices may be controlled by the master device.

The master device may synchronously control the slave devices based on a current signal, a voltage signal, and a frequency. Therefore, it is possible to minimize damage by flexibly responding to a capacity required in the field and taking prompt action in the event of a fault.

Figure 2A:
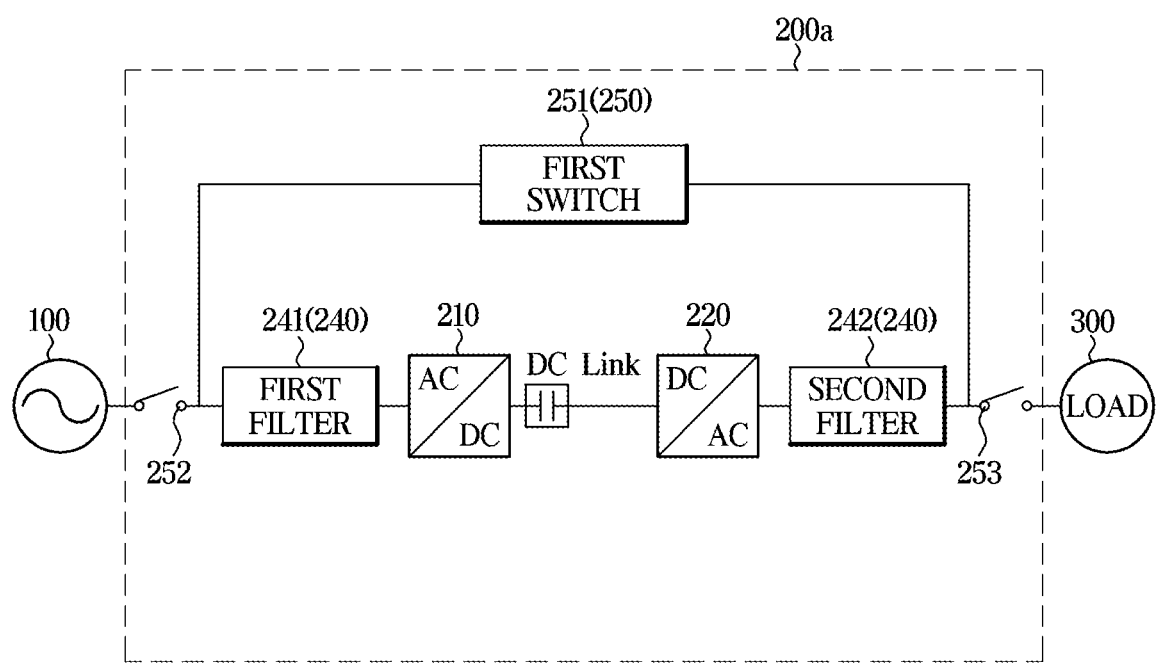
FIG. 2A is a diagram illustrating an example of a power management device of the power system shown in FIG. 1A.
Figure 2B:
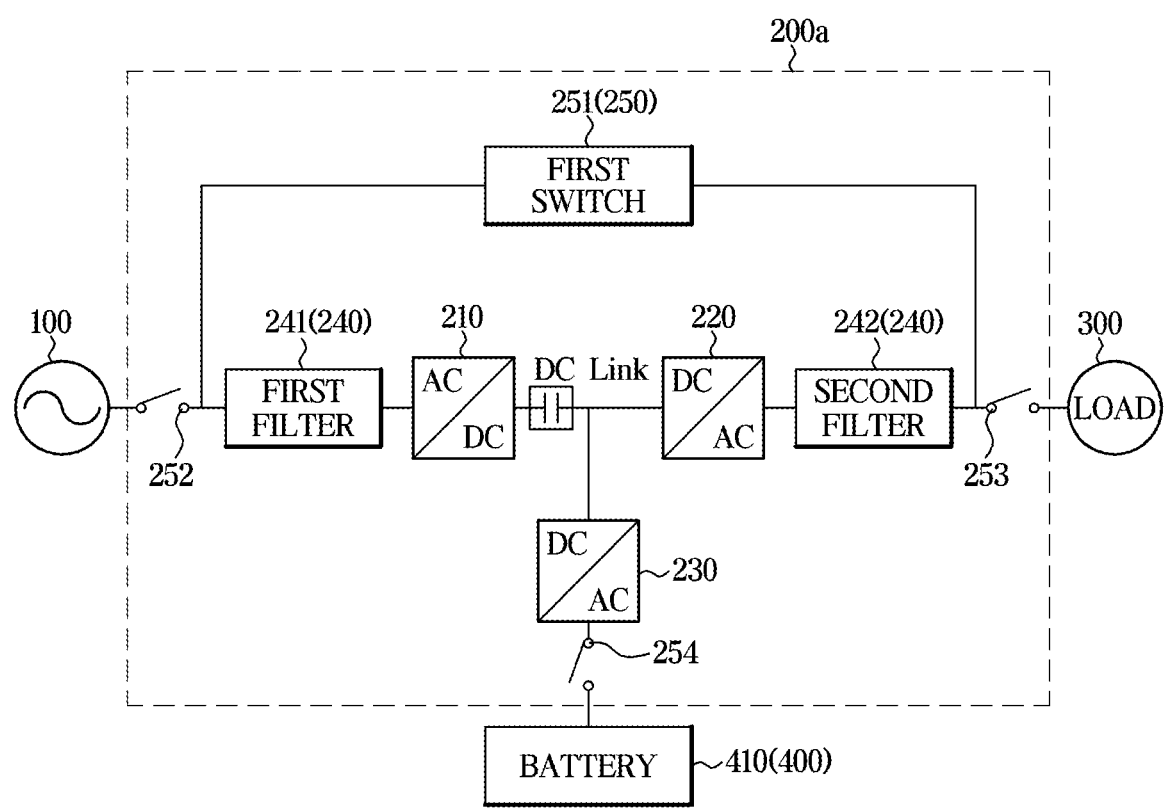
FIG. 2B is a diagram illustrating an example of a power management device of the power system shown in FIG. 1B.

FIGS. 2A and 2B are block diagrams of the power management device provided in the power management system.

The power management device 200 may or may not be provided with a third converter in response to whether it is connected to the energy storage system 400. In other words, the power management device 200 may or may not perform the conversion, management, and control functions connected to the energy storage system in response to whether it is connected to the energy storage system 400.

A configuration of the power management device 200 will be described.

FIG. 2A is a configuration diagram of the power management device of the power system shown in FIG. 1A.

The power management device 200b includes a first converter 210, a second converter 220, a filter unit 240, and a switch unit 250.

The first converter 210 may be provided between the power source 100 and the second converter 220.

The first converter 210 may be provided between a first filter 241 and the second converter 220.

The first converter 210 may be connected to the first filter 241 and the second converter 220.

The first converter 210 converts the AC component of the power supplied from the power source 100 into a DC component. Here, the power having the DC component may be DC power.

The first converter 210 may include an AC-DC converter.

The first converter 210 may include an Active Front End (AFE).

The AFE may convert an AC component of the power supplied from the power source 100 into a DC component and supply the converted DC power, and supply a constant DC voltage to a DC link.

The first converter 210 may receive the power filtered through the first filter 241.

The first converter 210 may supply the converted DC power to the second converter 220.

The first converter 210 includes one diode or a plurality of diodes and may also rectify the AC power input from the power source 100.

The first converter 210 includes one capacitor or a plurality of capacitors and may also smooth the power rectified by one diode or the plurality of diodes and convert the smoothed power into DC power having a constant magnitude. At this time, the first converter may lower a pulsating current of the current.

The first converter 210 may include an inverter.

The inverter of the first converter may be a parallel inverter connected in parallel to the power source 100. The parallel inverter may compensate for the PF.

The second converter 220 may be provided between the first converter 210 and the load 300.

The second converter 220 may be provided between the first converter 210 and a second filter 242.

The second converter 220 may be connected to the first converter 210 and the second filter 242.

The second converter 220 converts the DC component of the power received through the first converter 210 into the AC component. At this time, the power converted into the AC component may be AC power.

The second converter 220 may supply the converted AC power to the load 300 and supply the converted AC power to the load through the second filter 242.

The second converter 220 may include a DC-AC inverter.

The second converter 220 may convert the DC power of the DC link into AC power required by the load. Here, the DC link may be a path through which the power supplied from the first converter 210 moves.

The second converter 220 may include a plurality of power conversion switches configured to convert the DC power into three-phase AC power.

Figure 3:
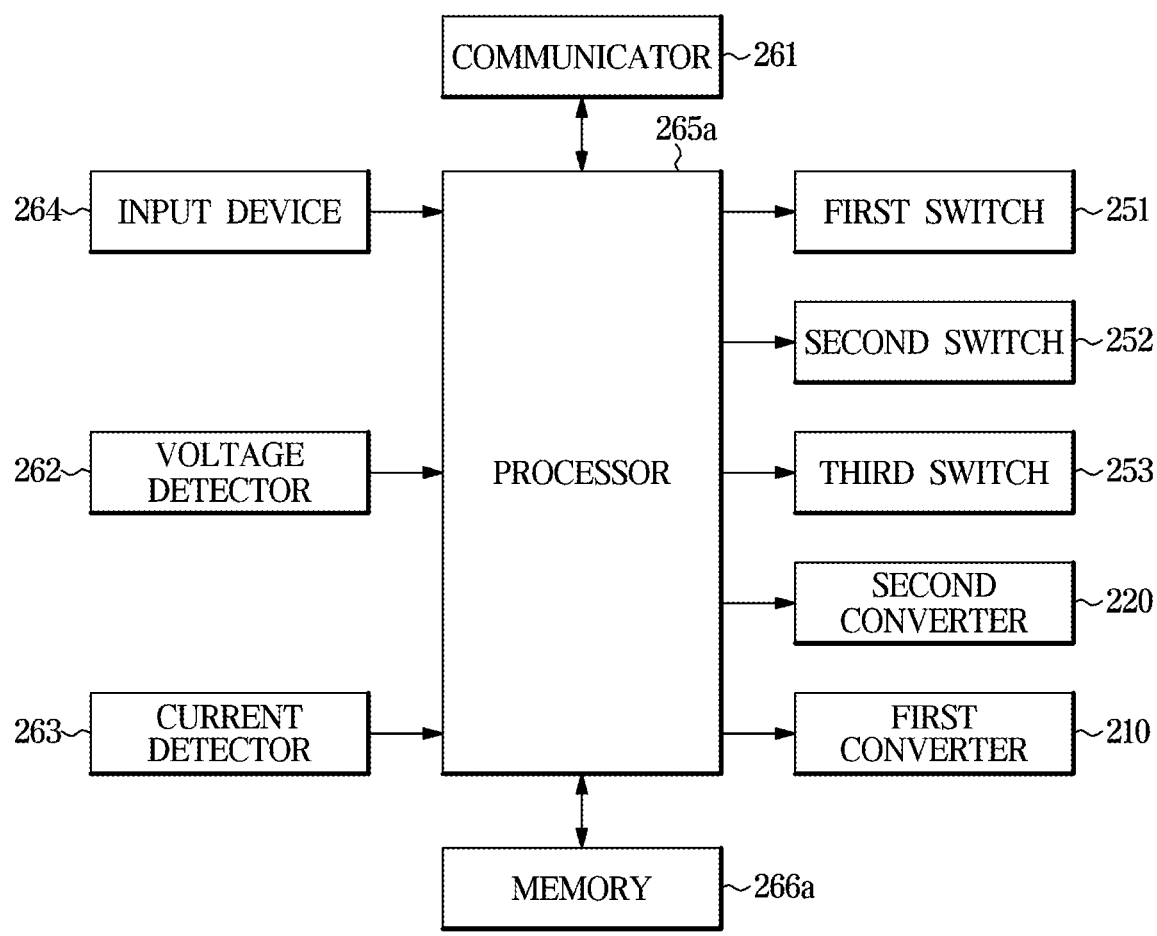
FIG. 3 is a diagram illustrating an example of the power management device shown in FIG. 2A.

Each of the plurality of power conversion switches modulates a pulse width of a signal output through the inverter by being turned on or off according to a control command of a processor 265 (see FIG. 3).

The signal output through the inverter may be a signal of a current or a signal of a voltage.

The second converter 220 may be a series inverter connected in series to the first converter. The series inverter may compensate for the voltage sag, the voltage swell, the harmonics, and the voltage imbalance.

The filter unit 240 may include one filter or two or more filters configured to remove noise, waveform distortion, and the like generated upon power conversion.

In some implementations, the filter unit 240 may include the first filter 241 and the second filter 242.

The first filter 241 may be provided between the power source 100 and the first converter 210.

The first filter 241 attenuates a harmonics component of the power supplied through the power source 100 and supplies the power with the attenuated harmonics component to the first converter 210.

The first filter 241 may attenuate distortion of a current due to switching noises and a switch dead time.

The first filter 241 may include an inductor-capacitor-inductor (LCL) filter in which two inductors and a capacitor are connected.

The second filter 242 may be provided between the second converter 220 and the load 300.

The second filter 242 attenuates the harmonics component of the power converted by the second converter 220 and supplies the power with the attenuated harmonics component to the load 300.

The second filter 242 may include an inductor-capacitor (LC) filter in which an inductor and a capacitor are connected.

The second filter 242 may suppress switching noises of the second converter 220 and attenuate the distortion of the current due to the switching noises and the switching dead time.

The switch unit 250 may include one switch or two or more switches.

In some implementations, the switch unit 250 may include a first switch 251 and may further include second and third switches 252 and 253.

The first switch 251 may be connected between the power source 100 and the load 300.

The first switch 251 may be a static switch.

The first switch 251 may directly supply the power of the power source 100 to the load 300 or cut off the power directly supplied to the load 300.

The first switch 251 may be configured to supply power at all times in response to the compensation mode or supply the power in the event of emergency.

The second switch 252 may be provided between the power source 100 and the first filter 241 and may allow power to be supplied from the power source 100 to the first filter 241 or cut off the power supplied from the power source 100 to the first filter 241.

The third switch 253 may be provided between the load 300 and the second filter 242 and may allow power to be supplied from the second filter 242 to the load 300 or cut off the power supplied from the second filter 242 to the load 300.

The first, second, and third switches 251, 252, and 253 may be turned on or off by the processor 265. A control configuration of the power management device will be described with reference to FIG. 3A.

At least one component may be added or deleted according to the performance of the components of the power management device 200a shown in FIG. 2A. In addition, it will be readily understood by those skilled in the art that the mutual positions of the components may be changed in response to the performance or structure of the system.

FIG. 2B is a diagram illustrating an example of a power management device of the power system shown in FIG. 1B.

The power management device 200b includes a first converter 210, a second converter 220, a third converter 230, a filter unit 240, and a switch unit 250.

In comparison with the power management device 200a, the power management device 200b may further include a third converter 230 and a fourth switch 254 in addition to the configuration of the power management device 200a. Among the components of the power management device 200b, the same reference numerals are given to the same components as those of the power management device 200a.

The first converter 210 may be provided between the power source 100 and the second converter 220.

The first converter 210 may be provided between a first filter 241 and the second converter 220.

The first converter 210 may be provided between the power source 100 and the third converter 230.

The first converter 210 may be connected to the first filter 241 and the second converter 220.

The first converter 210 converts an AC component of the power supplied from the power source 100 into a DC component. Here, the power having the DC component may be DC power.

The first converter 210 may include an AC-DC converter.

The first converter 210 may include an AFE.

The AFE may convert an AC component of the power supplied from the power source 100 into a DC component and supply the converted DC power, and supply a constant DC voltage to a DC link.

The first converter 210 may receive the power filtered through the first filter 241.

The first converter 210 may supply the converted DC power to the second converter 220 and the third converter 230.

The first converter 210 includes one diode or a plurality of diodes and may also rectify the AC power input from the power source 100.

The first converter 210 includes one capacitor or a plurality of capacitors and may also smooth the power rectified by one diode or the plurality of diodes and convert the smoothed power into DC power having a constant magnitude. At this time, the first converter may lower a pulsating current of the current.

The first converter 210 may include an inverter. The inverter of the first converter may be a parallel inverter connected in parallel to the power source 100. The parallel inverter may compensate for the PF and convert the power based on the required power of the battery.

The second converter 220 may be provided between the first converter 210 and the load 300.

The second converter 220 may be provided between the first converter 210 and a second filter 242.

The second converter 220 may be connected to the third converter 230.

The second converter 220 converts the DC component of the power received through the first converter 210 into the AC component. At this time, the power converted into the AC component may be AC power.

The second converter 220 converts the DC component of the power received through the third converter 230 into the AC component.

The second converter 220 may supply the converted AC power to the load 300 and supply the converted AC power to the load through the second filter 242.

The second converter 220 may include a DC-AC inverter.

The second converter 220 may convert the DC power of the DC link into AC power required by the load. Here, the DC link may be a path through which the power supplied from the first converter 210 or the third converter 330 moves.

The second converter 220 may include a plurality of power conversion switches configured to convert the DC power into three-phase AC power.

Each of the plurality of power conversion switches modulate a pulse width of a signal output through the inverter by being turned on or off according to a control command of a processor (see FIG. 3).

The signal output through the inverter may be a signal of a current or a signal of a voltage.

The second converter 220 may be a series inverter connected in series to the first converter. The series inverter may compensate for the voltage sag, the voltage swell, the harmonics, and the voltage imbalance.

The third converter 230 may be connected to the first converter 210, the second converter 220, and a battery 410 of the energy storage system.

The third converter 230 may be connected to a DC link including a capacitor.

The third converter 230 may include a DC-DC converter.

The third converter 230 converts a magnitude of the DC power converted by the first converter 210 and supplies the converted DC power to the battery 410 of the energy storage system when the battery is charged. At this time, the third converter 230 may convert the magnitude of the DC power converted by the first converter 210 based on the required power of the battery 410.

The third converter 230 may supply power of the battery to the DC link when the battery is discharged. At this time, the third converter 230 may convert a magnitude of the power of the battery based on the required power of the DC link and supply the converted power to the DC link.

The filter unit 240 may include one filter or two or more filters configured to remove noise, waveform distortion, and the like generated upon power conversion.

In some implementations, the filter unit 240 may include the first filter 241 and the second filter 242.

The first filter 241 may be provided between the power source 100 and the first converter 210.

The first filter 241 attenuates a harmonics component of the power supplied through the power source 100 and supplies the power with the attenuated harmonics component to the first converter 210.

The first filter 241 may attenuate distortion of a current due to switching noises and a switch dead time.

The first filter 241 may include an LCL filter.

The second filter 242 may be provided between the second converter 220 and the load 300.

The second filter 242 attenuates the harmonics component of the power converted by the second converter 220 and supplies the power with the attenuated harmonics component to the load 300.

The second filter 242 may include an LC filter.

The second filter 242 may suppress switching noises of the second converter 220 and attenuate the distortion of the current due to the switching noises and the switching dead time.

The switch unit 250 may include one switch or two or more switches.

In some implementations, the switch unit 250 may include a first switch 251 and may further include second, third, and fourth switches 252, 253, and 254.

The first switch 251 may be connected between the power source 100 and the load 300.

The first switch 251 may be a static switch.

The first switch 251 may directly supply the power of the power source 100 to the load 300 or cut off the power directly supplied to the load 300.

The first switch 251 may be configured to supply power at all times in response to the compensation mode or supply the power in the event of emergency.

The second switch 252 may be provided between the power source 100 and the first filter 241 and may allow power to be supplied from the power source 100 to the first filter 241 or cut off the power supplied from the power source 100 to the first filter 241.

The third switch 253 may be provided between the load 300 and the second filter 242 and may allow power to be supplied from the second filter 242 to the load 300 or cut off the power supplied from the second filter 242 to the load 300.

The fourth switch 254 may be provided between the battery 410 and the third converter 230 and may allow or block the power supply between the third converter 230 and the battery 410.

The first, second, third, and fourth switches 251, 252, 253, and 254 may be turned on or off by the processor. A control configuration of the power management device will be described with reference to FIG. 3B.

At least one component may be added or deleted in response to the performance of the components of the power management device 200b shown in FIG. 2B. In addition, it will be readily understood by those skilled in the art that the mutual positions of the components may be changed in response to the performance or structure of the system.

FIG. 3 is a control configuration diagram of the power management device shown in FIG. 2A.

The power management device 200a may include a communicator 261, a voltage detector 262, a current detector 263, an input device 264, a processor 265a, and a memory 266a and include the plurality of switches 250 (251, 252, and 253), the first converter 210, and the second converter 220.

The communicator 261 may include one or more components configured to enable the communication between an external device and the internal components of the power management device 200a and for example, may include at least one of a short-range communication module, a wired communication module, and a wireless communication module. Here, the external device may include the power source 100 and the load 300.

The short-range communication module may include various short-range communication modules configured to transmit and receive signals using a wireless communication network in a short range, such as a Bluetooth module, an infrared communication module, a radio frequency identification (RFID) communication module, a wireless local access network (WLAN) communication module, a near field communication (NFC) module, a ZigBee communication module, and the like.

The wired communication module may include various wired communication modules, such as not only a controller area network (CAN) communication module, a local area network (LAN) module, a wide area network (WAN) module or a value added network (VAN) module, but also a universal serial bus (USB), a high definition multimedia interface (HDMI), a digital visual interface (DVI), a recommended standard232 (RS-232), power line communication, or a plain old telephone service (POTS).

The wired communication module may further include a local interconnect network (LIN).

In addition to the Wi-Fi module and the wireless broadband module, the wireless communication module may include wireless communication modules configured to support various wireless communication methods, such as global system for mobile communication (GSM), code division multiple access (CDMA), wideband code division multiple access (WCDMA), universal mobile telecommunications system (UMTS), time division multiple access (TDMA), long term evolution (LTE), ultra-wideband (UWB) modules.

The voltage detector 262 detects a voltage of the power input to the power management device 200a and outputs a signal corresponding to the detected voltage.

The voltage detector 262 may output a three-phase voltage signal input to the power management device 200a.

The voltage detector 262 may be connected to a voltage transformer (VT) (also referred to as a potential transformer (PT)) and may detect the voltage input to the power management device 200a using the VT.

The current detector 263 detects a current input to the power management device 200a and outputs a current signal corresponding to the detected current.

The current detector 263 may output a three-phase current signal input to the power management device 200a.

The current detector 263 may be connected to a current transformer (CT) and may detect the current input to the power management device 200b using the CT.

The input device 264 may receive any one of an online compensation mode and an echo compensation mode.

The online compensation mode is a mode in which high-quality power is supplied to the load, and the echo compensation mode is a mode in which the power of the power source is supplied to the load 300 through the first switch to save energy.

The high-quality power may be power obtained by correcting the voltage sag, voltage swell, harmonics, voltage imbalance, and PF of the power supplied from the power source 100.

The online compensation mode may be a mode in which a higher quality power than that of the echo compensation mode is supplied.

The input device 264 may include a hardware device such as various buttons or switches, a pedal, a keyboard, a mouse, a track-ball, various levers, a handle, and a stick for user input.

In addition, the input device 264 may also include a graphical user interface (GUI) such as a touch pad for user input, that is, a software device. The touch pad may be implemented as a touch screen panel (TSP) to form a layered structure with a display.

When the touch pad is configured as a TSP having a layered structure with the touch pad, the display may also be used as an input device.

A processor 265a acquires voltage data corresponding to the received voltage signal and acquires current data corresponding to the received current signal.

The processor 265a may acquire a magnitude of the voltage from the voltage data and a magnitude of the current from the current data.

The magnitude of the voltage may be a voltage value, and the magnitude of the current may be a current value.

The processor 265a may analyze a waveform of the received voltage signal and a waveform of the received current signal.

The processor 265a may analyze a waveform of the received three-phase voltage signal and a waveform of the received three-phase current signal.

The processor 265a may acquire an amplitude of the voltage signal of each phase and a phase of the three-phase voltage signal by analyzing the waveform of the three-phase voltage signal.

The processor 265a may acquire a voltage value based on the amplitude of the voltage signal.

The processor 265a may acquire a voltage value input to the power management device 200a based on an amplitude of any one of the three phase voltage signals.

The processor 265a may acquire each of voltage values of the three phases based on the amplitude of the three-phase voltage signal and acquire the voltage values input to the power management device 200a by averaging the voltage values of the three phases.

The processor 265a may also acquire the minimum voltage value among the voltage values of the three phases as the voltage value input to the power management device 200a, also acquire a median voltage value among the voltage values of the three phases as the voltage value input to the power management device 200a, and also acquire a maximum voltage value among the voltage values of three phases as the voltage value input to the power management device 200a.

The processor 265a may acquire the phase of the three-phase current signal and the frequency of the three-phase current signal by analyzing the waveform of the three-phase current signal.

The processor 265a may acquire a current value input to the power management device 200a based on an amplitude of any one of the three phase current signals.

The processor 265a may acquire each of current values of the three phases based on the amplitude of the three-phase current signal and acquire the current values input to the power management device 200a by averaging the current values of the three phases.

The processor 265a may also acquire the minimum current value among the current values of the three phases as the current value input to the power management device

200a, also acquire a median current value among the current values of the three phases as the current value input to the power management device 200a, and also acquire a maximum current value among the current values of three phases as the current value input to the power management device 200a.

The processor 265a may determine the power quality based on the amplitude of the voltage signal, the phase of the voltage signal, the phase of the current signal, and the frequency of the current signal, which have been acquired and determine whether the compensation control is performed based on the determined power quality.

The processor 265a may convert the input power into AC power having target quality by performing the compensation control using the first converter 210 and the second converter 220 when it is determined that the determined power quality is not the target quality and output the converted AC power having the target quality.

Items of the power quality determined by the processor 265a may include a voltage sag state, a voltage swell state, a harmonics state, a voltage unbalance state, and a PF state, and may further include an interruption state.

The target quality may be quality when the state of the power input to the power management device is not any of the voltage sag state, the voltage swell state, the harmonics state, the voltage unbalance state, and the PF state.

When it is determined that the state of the power input to the power management device is an abnormal state in which at least one of the voltage sag state, the voltage swell state, the harmonics state, the voltage unbalance state, and the PF state has occurred, the processor 265a may perform the compensation control on items determined as abnormal.

A configuration of the processor 265a for determining the abnormal state of the power quality will be described in more detail.

The processor 265a compares the acquired voltage value with a reference voltage value to determine whether the acquired voltage value is smaller than the reference voltage value, confirms a ratio of the acquire voltage value to the reference voltage value, when it is determined that the acquired voltage value is smaller than the reference voltage value, and determines that the state of the power input to the power management device is the voltage sag state when it is determined that the confirmed ratio is included within a reference ratio range.

Here, the reference ratio range may be a first reference ratio to a second reference ratio.

The first reference ratio may be 10%, and the second reference ratio may be 90%.

In other words, when it is determined that the state of the power input to the power management device is the voltage sag state, the acquired ratio of the voltage value to the reference voltage value may be included between −10% and −90%.

Here, the acquired voltage value may be a voltage value input to the power management device, and the reference voltage value may be a rated voltage value.

The processor 265a may confirm the ratio of the acquired voltage value to the reference voltage value when it is determined that the acquired voltage value is smaller than the reference voltage value, determine whether the confirmed ratio is smaller than a first reference ratio when it is determined that the confirmed ratio is out of the reference ratio range, and determine the voltage sag as a normal state when it is determined that the confirmed ratio is smaller than the first reference ratio.

The processor 265a may determine whether the confirmed ratio exceeds a second reference ratio and determine the state of the power input to the power management device as the interruption state when it is determined that the confirmed ratio exceeds the second reference ratio.

The processor 265a may confirm the ratio of the acquired voltage value to the reference voltage value when it is determined that the acquired voltage value is greater than or equal to the reference voltage value, determine the state of the power input to the power management device as the voltage swell state when it is determined that the confirmed ratio is greater than or equal to a third reference ratio, and determine the voltage swell state as the normal state when it is determined that the confirmed ratio is smaller than the third reference ratio. Here, the third reference ratio may be 10%.

When it is determined that the state of the power input to the power management device as the voltage swell state, the acquired ratio of the voltage value to the reference voltage value may be 10% or more.

The processor 265a analyzes the waveform of the three-phase voltage signal, acquires the voltage value of each phase based on the waveform analysis result, determines an unbalance ratio based on the voltage value of each phase, and determines that the state of the power input to the power management device is the voltage unbalance state when the determined unbalance ratio is greater than or equal to a fourth reference ratio. The fourth reference ratio may be 10% or less, for example, 3%.

When determining the voltage unbalance state, the processor 265a may confirm each of a fundamental wave frequency of the three-phase voltage signal and acquire a voltage value based on the three-phase voltage signal having the confirmed fundamental wave frequency.

The processor 265a may analyze the waveform of the current signal, confirm the frequency of the current signal in response to the waveform analysis result, determine whether a signal having an integer multiple of the fundamental wave frequency (60 Hz) among frequencies of the confirmed current signal is present, and determine the state of the power input to the power management device as the harmonics state when it is determined that one signal or two or more signals having the integer multiple are present.

The processor 265a may determine the harmonics state by confirming the frequencies of one signal or two or more current signals among the three-phase current signal.

The processor 265a confirms the fundamental wave frequency of each of the three-phase voltage signal, confirms the fundamental wave frequency of each of the three-phase current signal, compares the current signal and the voltage signal having the same phase, respectively, to confirm whether a phase difference between the current signal and the voltage signal for each phase, and determines that the state of the power input to the power management device is the PF state when it is determined that the phase difference in at least one phase is present.

The configuration of the processor 265a for the compensation control for the items determined as abnormal will be described in more detail.

When it is determined that the state of the power input to the power management device is the voltage sag state, the processor 265a may perform the compensation control for the voltage sag state by discharging a capacitor c provided in the DC link and additionally supplying a voltage of the capacitor to the power management device. At this time, the processor 265a may supply a voltage of 10% to 30% of the reference voltage value.

In other words, when it is determined that the state of the power input to the power management device is the voltage sag state, the processor 265a may sum the voltage input to the power management device and the voltage of the capacitor c provided in the DC Link so that the voltage value of the power management device reaches the reference voltage value.

As described above, it is possible to prevent a malfunction of the load, a malfunction of the processor, and the like by performing the compensation control for the voltage sag in the voltage sag state.

When it is determined that the state of the power input to the power management device is the voltage swell state, the processor 265a may perform the compensation control for the voltage swell by charging the capacitor provided in the DC link and decreasing the voltage of the power management device.

At this time, the processor 265a may decrease the voltage of 10% to 20% of the reference voltage value.

In other words, when it is determined that the state of the power input to the power management device is the voltage swell state, the processor 265a may allow the voltage value of the power management device to reach the reference voltage value so that the voltage input to the power management device is decreased by the capacitor provided in the DC link.

As described above, it is possible to prevent a malfunction of the load, a malfunction of the processor, and the like and prevent a fault of the power management device by performing the compensation control for the voltage swell when the state of the power input to the power management device is the voltage swell state.

When it is determined that the state of the power input to the power management device is the voltage unbalance state, the processor 265a may acquire pulse width modulation information for each phase so that the voltage value of each phase reaches the reference voltage value based on the voltage unbalance ratio and perform the compensation control for the voltage unbalance state by controlling the switches of the second converter 220 based on the acquired pulse width modulation information for each phase.

When it is determined that the state of the power input to the power management device is the voltage unbalance state, the processor 265a may also allow the voltage value for each phase to reach the reference voltage value based on the voltage unbalance ratio by controlling the first converter 210.

By performing the compensation control for the voltage unbalance state as described above, it is possible to decrease power loss, prevent the fault of the components in the power management device, prevent the vibrations and noises of components in the power management device, and prevent the malfunction or fault of the load.

When it is determined that the state of the power input to the power management device is the harmonic state, the processor 265a may perform the compensation control for the harmonics state by generating and outputting an inverse phase signal with respect to a current signal having an integer multiple.

When it is determined that the state of the power input to the power management device is the harmonics state, the processor 265a may control an operation of at least one of the first converter 210 and the second converter 220 to generate the inverse phase signal with respect to the current signal having the integer multiple.

In other words, when it is determined that the state of the power input to the power management device the harmonics state, the processor 265a cancels the harmonics signal by generating and outputting the inverse phase signal with respect to the current signal having the integer multiple.

The power management device may further include an active filter and also control the compensation for the harmonics state by generating an inverse phase harmonics signal using the active filter.

The power management device may further include a passive filter and also allow the passive filter to absorb the harmonics signal.

By performing the compensation for the harmonics as described above, it is possible to prevent the fault and malfunction of the processor, the fault of the capacitor, and the heat generation, noise, and load fault of the power management device, prevent the communication fault, and prevent the power loss.

When it is determined that the state of the power input to the power management device is the PF state, the processor 265a performs the phase compensation control so that the phase difference between the voltage signal and the current signal reaches zero degrees.

The processor 265a may perform the compensation control for the PF by controlling the charging and discharging of the capacitor c provided in the DC link.

When it is determined that the state of the power input to the power management device is the PF state, the processor 265a may also control the operation of at least one of the first converter 210 and the second converter 220 so that the phase difference between the voltage signal and the current signal reaches zero degrees.

As described above, it is possible to decrease the power loss by performing the PF compensation.

The processor 265a confirms the compensation mode received by the input device 264 and confirms whether the received compensation mode is the online compensation mode or the echo compensation mode.

When it is determined that the compensation mode received by the input device 264 is the online compensation mode, the processor 265a controls the turn-off of the first switch 251 and controls the turn-on of the second and third switches 252 and 253 so that the power of the power source 100 is supplied to the load 300 through the first filter 241, the first and second converters 210 and 220, and the second filter 242.

The processor 265a determines the power quality based on the voltage signal of the voltage detector 262 and the current signal of the current detector 263 while performing the online compensation mode and performs the compensation control in response to the determination result so that the power of the power source 100 is supplied to the load 300 through the first filter 241, the first and second converters 210 and 220, and the second filter 242.

Figure 4:
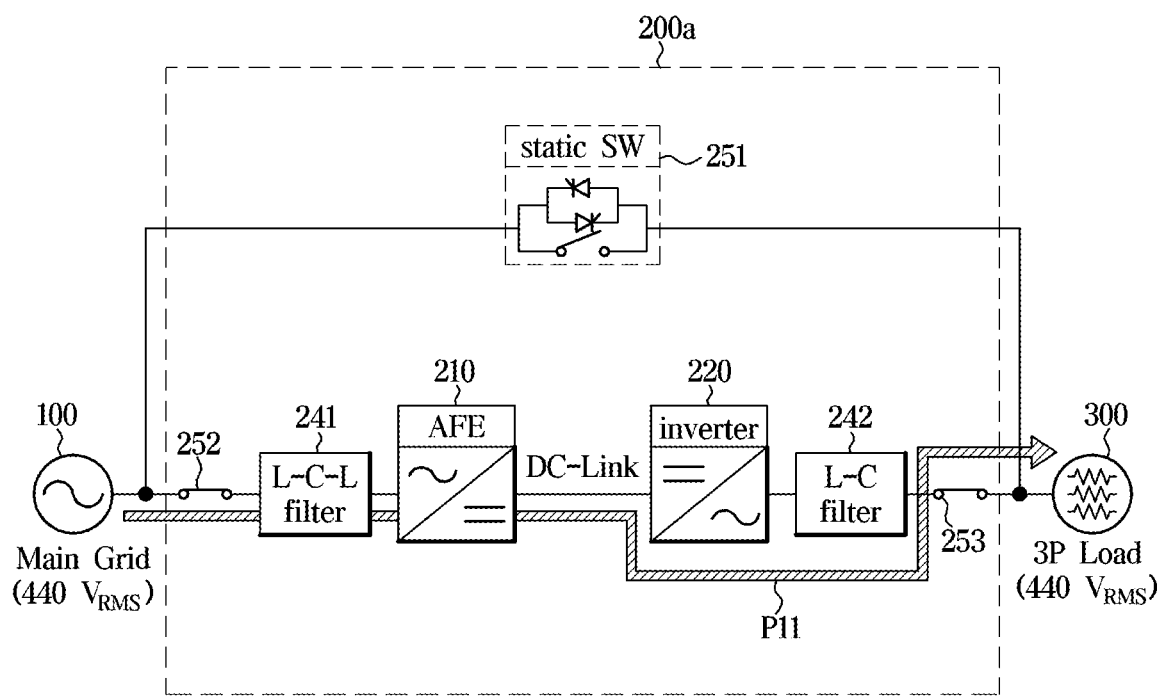
FIG. 4 is a diagram illustrating an exemplary power supply path of the power management device shown in FIG. 3.

As shown in FIG. 4, a power supply path P11 connecting the power source 100, the second switch 252, the first filter 241, the first and second converters 210 and 220, the second filter 242, and the third switch 253 may be formed by controlling the turn-off of the first switch 251 and the turn-on of the second and third switches 252 and 253 while the online compensation mode is performed.

The processor 265a may perform the compensation for the voltage sag and the voltage swell through the second converter 220 and the second filter 242 while supplying the power of the power source 100 to the load 300 through the power supply path P11.

The processor 265a may also perform the compensation for the voltage unbalance, the PF, and the harmonics through at least one of the first converter, the DC link, and the second converter 220 while supplying the power of the power source 100 to the load 300 through the power supply path P11.

When it is determined that a fault has occurred in the power management device 200a while the online compensation mode is performed, the processor 265a controls the turn-on of the first switch 251 and the turn-off of the second and third switches 252 and 253 so that the power of the power source 100 is supplied to the load 300 through the first switch 251.

Figure 5:
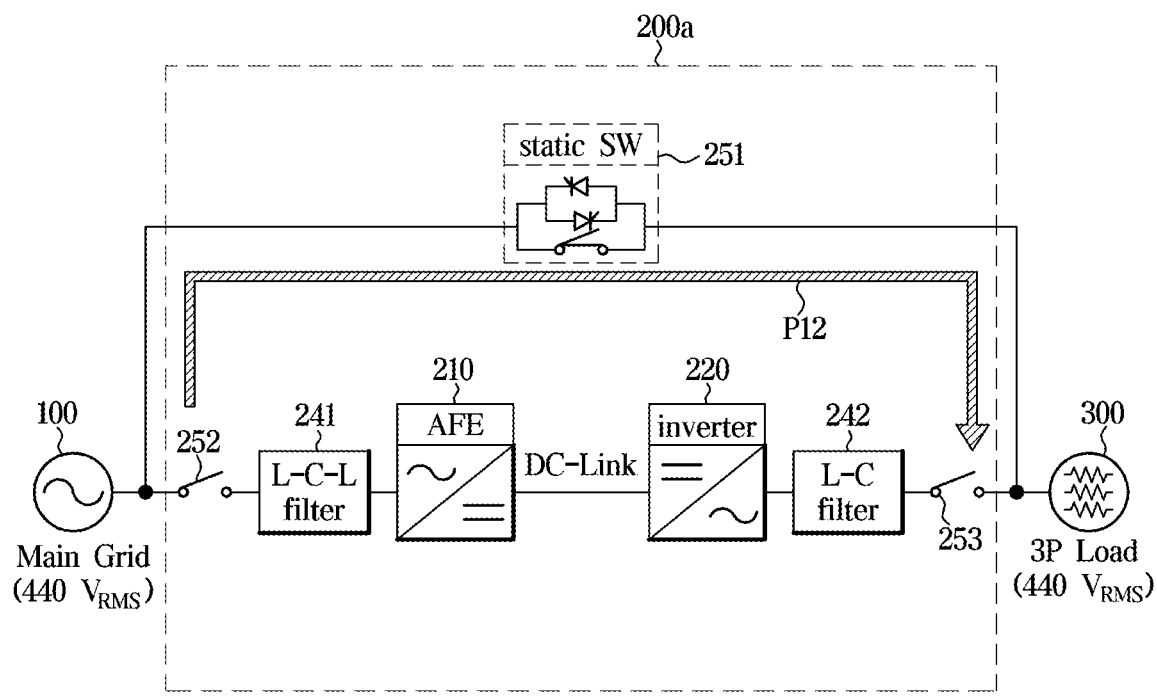
FIG. 5 is a diagram illustrating an exemplary power supply path of the power management device shown in FIG. 3.

As shown in FIG. 5, when it is determined that a fault has occurred while the online compensation mode is performed, the processor 265a may form a power supply path P12 connecting the power source 100, the first switch 251, and the load 300 by controlling the turn-on of the first switch 251 and controlling the turn-off of the second and third switches 252 and 253. The power management device 200a may directly supply the power of the power source 100 to the load 300 through the power supply path P12.

A fault of the power management device 200a may include a fault of at least one of the first filter 241, the first and second converters 210 and 220, and the second filter 242.

When it is determined that the compensation mode received by the input device 264 is the echo compensation mode, the processor 265a controls the turn-on of the first switch 251 so that the power of the power source 100 is supplied to the load 300 through the first switch 251. In other words, the power of the power source may be supplied to the load through the power supply path P12 shown in FIG. 5.

The processor 265a determines the quality of the power input to the power management device 200a based on the voltage signal of the voltage detector 262 and the current signal of the current detector 263 while performing the echo compensation mode, performs the compensation control through the converter by turning the second and third switches 252 and 253 on in a state in which the first switch is turned on when it is determined that the power quality is not the target quality, or controls the turn-off of the first switch 251 and controls the turn-on of the second and third switches 252 and 253 so that the power of the power source 100 is supplied to the load 300 through the first filter 241, the first and second converters 210 and 220, and the second filter 242.

When it is determined that the power quality is not the target quality, it includes the determination that the power quality has been abnormal.

More specifically, when it is determined that the power quality with respect to at least one of the harmonics, the voltage imbalance, and the PF has been abnormal while the echo compensation mode is performed, the processor 265a may turn on the second and third switches 252 and 253 in the state in which the first switch 251 is turned on and perform the compensation control through the first and second converters 210 and 220 so that the compensated power is supplied to the load 300 in parallel through the first and second converters 210 and 220.

At this time, the processor 265a may supply the power of the power source 100 to the load 300 in parallel through the power supply path P11 shown in FIG. 4 and the power supply path P12 shown in FIG. 5.

When it is determined that the power quality with respect to the voltage sag or the voltage swell has been abnormal while the echo compensation mode is performed, the processor 265a controls the turn-off of the first switch 251 and controls the turn-on of the second and third switches 252 and 253 so that the power of the power source 100 is supplied to the load 300 through the first filter 241, the first and second converters 210 and 220, and the second filter 242.

At this time, the processor 265a may supply the power of the power source 100 to the load 300 in parallel through the power supply path P11 shown in FIG. 4.

The processor 265a re-determines the quality of the power input to the power management device 200a based on the voltage signal of the voltage detector 262 and the current signal of the current detector 263 while supplying the power of the power source 100 to the load 300 through the first filter 241, the first and second converters 210 and 220, and the second filter 242 and controls the turn-on of the first switch 251 and the turn-off of the second and third switches 252 and 253 when it is determined that the re-determined power quality is the target quality so that the power of the power source 100 is supplied to the load 300 through the first switch 251.

Considering that the abnormalities of the harmonics, the voltage imbalance, and the PF occur more frequently than those of the voltage sag and the voltage swell, the processor 265a maintains the turn-on of the first switch when the harmonics, the voltage imbalance, and the PF are abnormal and turns off the first switch only when the power quality with respect to the power quality of the voltage swell is abnormal.

Therefore, it is possible to decrease the repetitive operation of turning on and off the first switch, thereby preventing the fault of the first switch. When it is determined that that the fault of the first switch 251 of the power management device 200a has occurred while the echo compensation mode is performed, the processor 265a determines the power quality based on the voltage signal of the voltage detector 262 and the current signal of the current detector 263 and performs the compensation control in response to the determination result so that the power of the power source 100 is supplied to the load 300 through the first filter 241, the first and second converters 210 and 220, and the second filter 242.

The processor 265a may change the power supply path for supplying the power of the power source 100 to the load 300 in response to the compensation mode received by the input device, the fault state of the power management device, and the abnormal state of the power quality.

The processor 265a may be implemented by a memory configured to store data on an algorithm for controlling the operations of the components in the power management device 200a or a program for reproducing the algorithm and a processor configured to perform the above-described operation using the data stored in the memory. In this case, the memory and the processor may be implemented as separate chips, respectively. Alternatively, the memory and the processor may also be implemented as a single chip.

The memory 266a stores reference information, such as the reference voltage value, the reference ratio range, and the first, second, third, and fourth reference ratios.

The memory 266a may be implemented as at least one of non-volatile memory devices, such as a cache, a read only memory (ROM), a programmable ROM (PROM), an erasable programmable ROM (EPROM), an electrically erasable PROM (EEPROM), and a flash memory, volatile memory devices, such as a random access memory (RAM), and storage media, such as a hard disk drive (HDD) and a CD-ROM, but the present disclosure is not limited thereto.

Meanwhile, each component shown in FIG. 3 refers to software and/or hardware components, such as a field programmable gate array (FPGA) and an application specific integrated circuit (ASIC).

At least one component may be added or deleted in response to the performance of the components of the power management device shown in FIG. 3. In addition, it will be readily understood by those skilled in the art that the mutual positions of the components may be changed in response to the performance or structure of the system.

Figure 6:
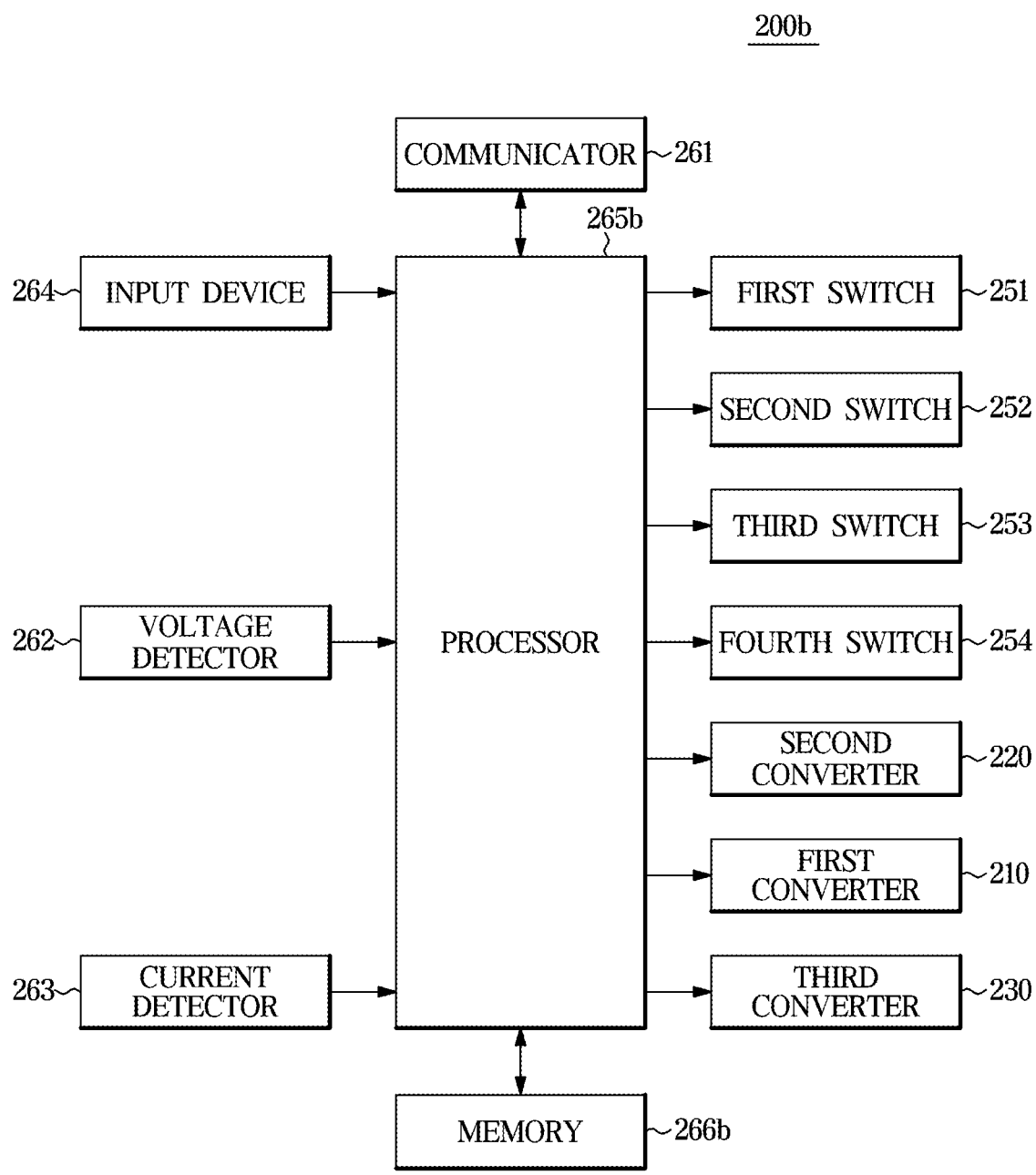
FIG. 6 is a diagram illustrating an example of the power management device shown in FIG. 2B.

FIG. 6 is a control configuration diagram of the power management device shown in FIG. 2B.

The power management device 200b may include a communicator 261, a voltage detector 262, a current detector 263, an input device 264, a processor 265b, and a memory 266b, and include a plurality of switches 250 (251, 252, 253, and 254), a first converter 210, a second converter 220, and a third converter 330.

Since the communicator 261, the voltage detector 262, the current detector 263, and the input device 264 in FIG. 6 is the same as the communicator 261, the voltage detector 262, the current detector 263, and the input device 264 in FIG. 3, descriptions thereof will be omitted.

A processor 265b may analyze a waveform of the received voltage signal and a waveform of the received current signal to acquire an amplitude of a voltage signal of each phase and a phase of a three-phase voltage signal and acquire a phase of a three-phase current signal and a frequency of the three-phase current signal. Since this is the same as the processor 265a, a detailed description thereof will be omitted.

The processor 265b may monitor the power quality based on the amplitude of the voltage signal, the phase of the voltage signal, the phase of the current signal, and the frequency of the current signal, which have been acquired and determine whether the control compensation for the power quality is performed based on the monitored information.

When it is determined that the determined power quality is not the target quality, the processor 265b performs the compensation control using at least one of the first converter 210, the second converter 220, and the third converter 230 so that the converted power may be output by being converted into the power of the target quality.

Items of the power quality determined by the processor 265b may include a voltage sag state, a voltage swell state, a harmonics state, a voltage unbalance state, and a PF state, and may further include an interruption state.

The target quality may be quality when the state of the power input to the power management device is not any of the voltage sag state, the voltage swell state, the harmonics state, the voltage unbalance state, and the PF state.

When it is determined that the state of the power input to the power management device is an abnormal state in which at least one of the voltage sag state, the voltage swell state, the harmonics state, the voltage unbalance state, and the PF state has occurred, the processor 265b may perform the compensation control for the items determined as the abnormal state.

Since a configuration of the processor 265b for determining the abnormal state of the power quality is described above, a description thereof will be omitted.

A configuration of the processor 265b for the compensation control for the items determined as the abnormal state will be described in more detail.

When it is determined that the state of the power input to the power management device is the voltage sag state, the processor 265b may perform the compensation control for the voltage sag state by discharging a battery 410 and additionally supplying a voltage of the battery 410 to the power management device 200b. At this time, the processor 265b may compensate for the voltage sag state to 100% of a reference voltage value.

In other words, when it is determined that the state of the power input to the power management device is the voltage sag state, the processor 265a may control an operation of the third converter 230 to discharge the battery 410 and control an operation of the second converter 220 so that the power with improved quality by the compensation control is supplied to the load 300.

As described above, it is possible to prevent a malfunction of the load, a malfunction of the processor, and the like by performing the compensation control for the voltage sag in the voltage sag state.

When it is determined that the state of the power input to the power management device is the voltage swell state, the processor 265b may perform the compensation control for the voltage swell state by charging the battery 410 to decrease the voltage of the power management device 200b.

At this time, the processor 265b may decrease the voltage swell state to 100% of the reference voltage value.

In other words, when it is determined that the state of the power input to the power management device is the voltage swell state, the processor 265b may control the operation of the third converter 230 to control the charging of the battery and control the operation of the second converter 220 so that the power with improved quality by the compensation control is supplied to the load 300.

As described above, it is possible to prevent a malfunction of the load, a malfunction of the processor, and the like and prevent a fault of the power management device by performing the compensation control for the voltage swell when the state of the power input to the power management device is the voltage swell state.

Since the compensation control of the processor 265b for the voltage unbalance state, the harmonics state, and the PF state is the same as the compensation control of the processor 265a, a description thereof will be omitted.

The processor 265b may confirm the compensation mode received by the input device 264, control a change in a path for supplying power in response to the received compensation mode, and control the change of the path in response to the fault state and the abnormal state (which are the abnormal state of the power quality).

The processor 265b may control operations of first, second, third, and fourth switches 251, 252, 253, and 254 when controlling the change in the path for supplying power. This will be described with reference to FIGS. 7 to 12.

Figure 7:
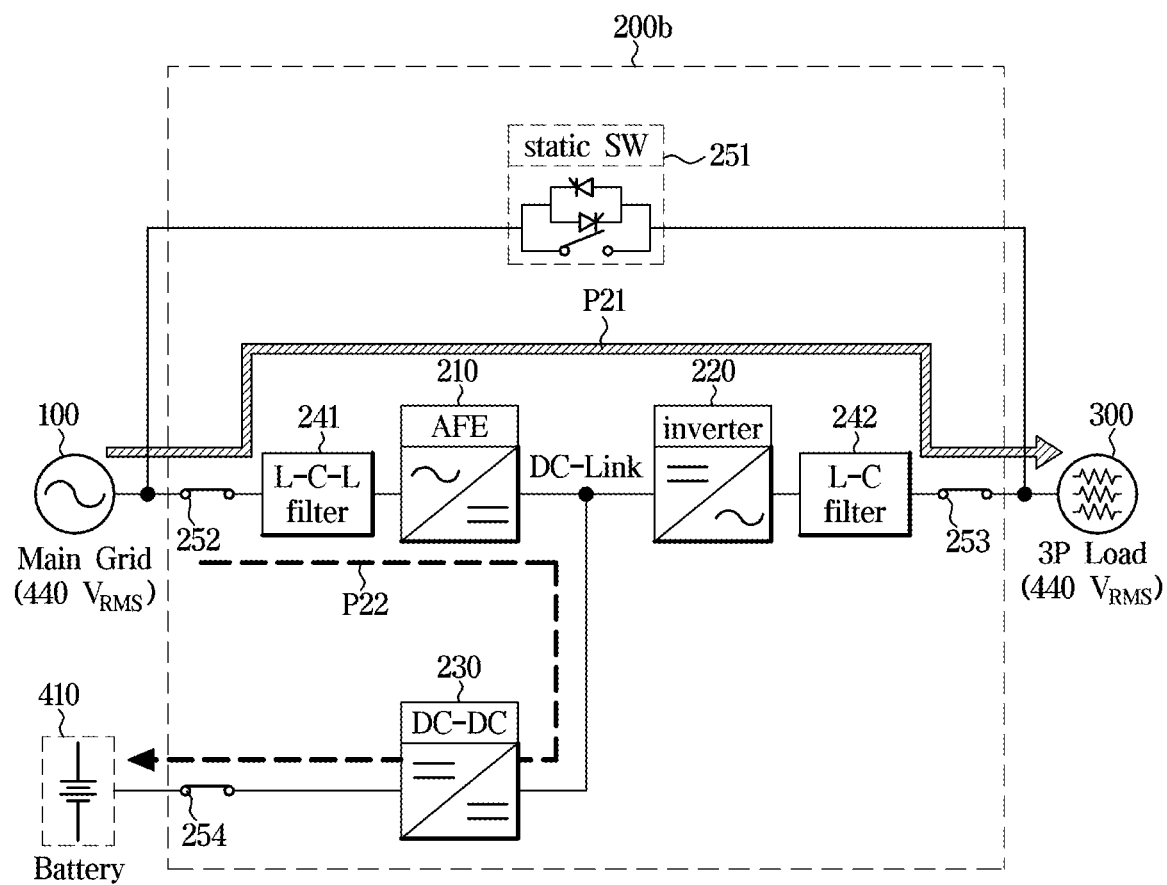
FIGS. 7 to 13 are exemplary diagrams of a power supply path of the power management device shown in FIG. 6.

As shown in FIG. 7, when it is determined that the compensation mode received by the input device 264 is the online compensation mode, the processor 265b controls the turn-off of the first switch 251 and controls the turn-on of the second and third switches 252 and 253.

At this time, the power source 100, the second switch 252, the first filter 241, the first and second converters 210 and 220, the second filter 242, and the third switch 253 may form a power supply path P21. The power management device 200b supplies the power of the power source 100 to the load 300 through the power supply path P21.

The processor 265b confirms a charged amount of the battery 410 of the energy storage system while performing the online compensation mode and controls the charging of the battery 410 when it is determined that the confirmed charged amount of the battery is smaller than a reference charged amount.

The processor 265b may receive information on the charged amount of the battery from an EMS.

As shown in FIG. 7, when controlling the charging of the battery, the processor 265b controls the turn-on of the fourth switch 254 and controls operations of the first converter 210 and the third converter 230.

At this time, the power source 100, the second switch 252, the first filter 241, the first and third converters 210 and 230, and the fourth switch 254 may form a power supply path P22. The power management device 200b supplies the power of the power source 100 to the battery 410 through the power supply path P22.

When it is determined that the charged amount of the battery 410 is greater than or equal to a maximum charged amount, the processor 265b controls the turn-off of the fourth switch 254 so that the charging of the battery 410 is ended.

The processor 265b determines the power quality based on the voltage signal of the voltage detector 262 and the current signal of the current detector 263 while power is supplied to the load through the power supply path P21 and performs the compensation control in response to the determination result so that the power of the power source 100 is supplied to the load 300 through the first filter 241, the first and second converters 210 and 220, and the second filter 242.

Figure 8:
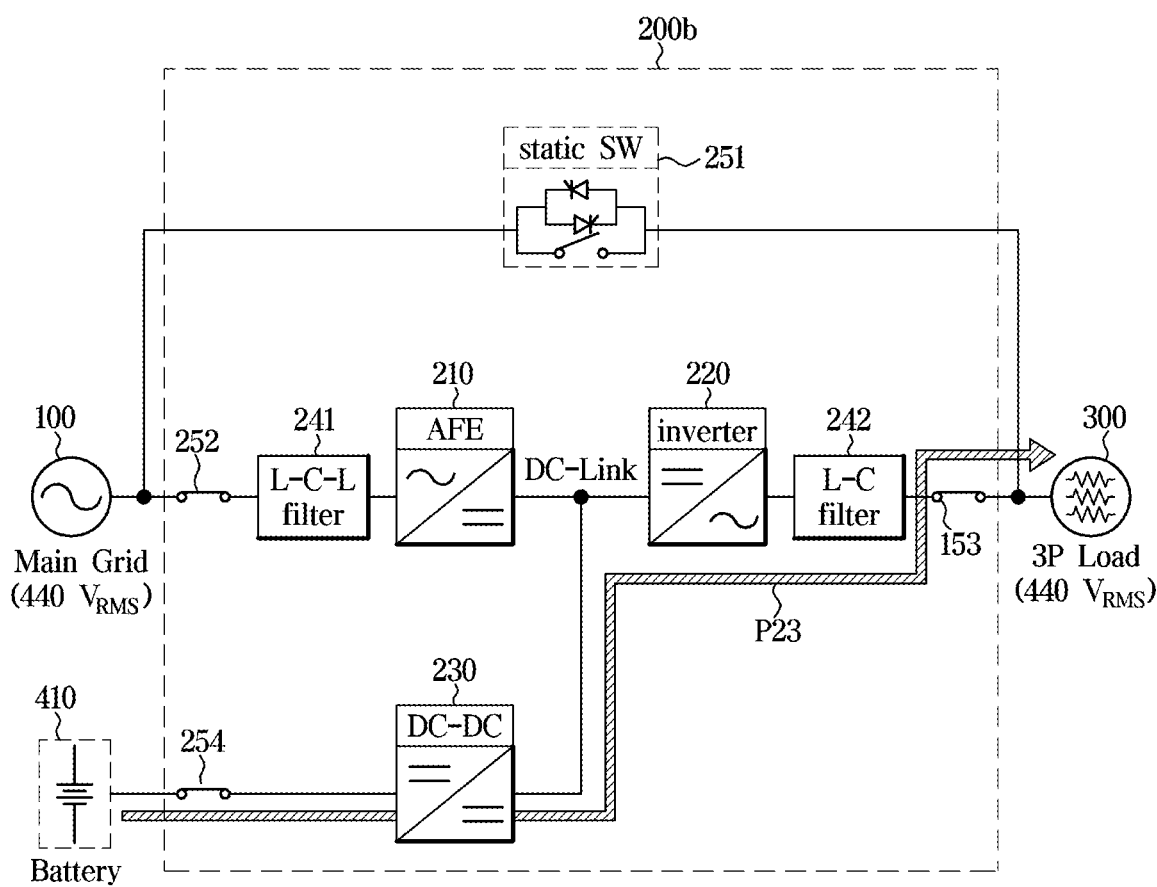

As shown in FIG. 8, when it is determined that the power quality with respect to the voltage sag state or the voltage swell state has been abnormal while the power is supplied to the load through the power supply path P21 according to the online compensation mode, the processor 265b forms a power supply path P23 connecting the battery 410, the third converter 230, the second converters 220, and the second filter 242 by controlling the turn-on of the fourth switch 254.

The processor 265b performs the compensation control for the voltage sag by controlling the operations of the second converter 220 and the third converter 230 to discharge the battery when it is determined that the state of the power input to the power management device is the voltage sag and perform the compensation control for the voltage swell by controlling the operations of the second converter 220 and the third converter 230 to charge the battery when it is determined that the state of the power input to the power management device is the voltage swell state.

When it is determined that the power quality with respect to the voltage sag or the voltage swell has been abnormal while the online compensation mode is performed, the processor 265b supplies the compensated power to the load through the power supply path P23 shown in FIG. 8 while supplying the power to the load through the power supply path P21 shown in FIG. 7. In other words, the processor 265b supplies the power to the load 300 through the two power supply paths P21 and P23 having a parallel structure.

When it is determined that a fault has occurred in the power management device 200b while the online compensation mode is performed, the processor 265b controls the turn-on of the first switch 251 and the turn-off of the second and third switches 252 and 253 so that the power of the power source 100 is supplied to the load 300 through the first switch 251.

The fault of the power management device 200b may include a fault of at least one of the first filter 241, the first and second converters 210 and 220, and the second filter 242.

When it is determined that the compensation mode received by the input device 264 is the echo compensation mode, the processor 265b controls the turn-on of the first switch 251 and the turn-off of the second, third, and fourth switches 252, 253, and 254 so that the power of the power source 100 is supplied to the load 300 through the first switch 251.

Figure 9:
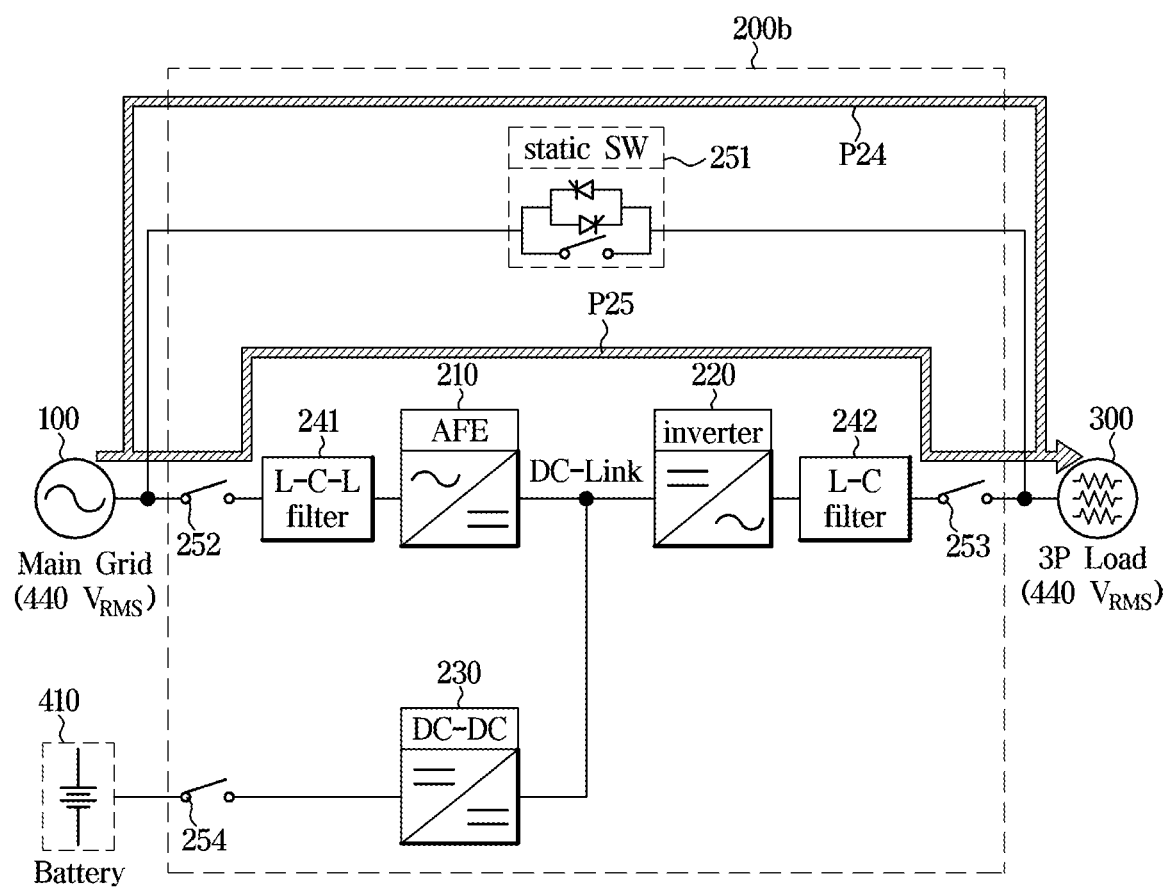

As shown in FIG. 9, in the echo compensation mode, a power supply path P24 connecting the power source 100, the first switch 251, and the load 300 may be formed by controlling the turn-on of the first switch 251.

The processor 265b determines the quality of the power input to the power management device 200b based on the voltage signal of the voltage detector 262 and the current signal of the current detector 263 while performing the echo compensation mode, performs the compensation control through the first and second converters 210 and 220 by turning the second and third switches 252 and 253 on in a turned-on state of the first switch when it is determined that the power quality is the target quality, or turns off the first switch and turns on the second, third, and fourth switches 252, 253, and 254 so that the power of the power source is supplied to the load 300 through the first, second, and third converters 210, 220, and 230. When it is determined that the power quality is not the target quality, it includes the determination that the power quality has been abnormal.

More specifically, as shown in FIG. 9, when it is determined that the power quality with respect to at least one of the harmonics, the voltage unbalance, and the PF has been abnormal while the echo compensation mode is performed, the processor 265b may turn on the second and third switches 252 and 253 in the state in which the first switch 251 has been turned on and perform the compensation control through the first and second converters 210 and 220 so that the compensated power is supplied to the load in parallel through the first and second converters 210 and 220.

In this case, as shown in FIG. 9, the processor 265b may form the power supply path P24 through the first switch 251 and a power supply path P25 having a structure parallel with the power supply path P24 and connecting the power source 100, the first filter 241, the first and second converters 210 and 220, the second filter 242, and the load 300. In other words, the processor 265b supplies the power of the power source 100 to the load 300 through the power supply paths P24 and P25 having the parallel structure.

When it is determined that the power quality with respect to the voltage sag or the voltage swell has been abnormal while the echo compensation mode is performed, the processor 265b controls the turn-off of the first switch 251 and the turn-on of the second, third, and fourth switches 252, 253, and 254 so that the power of the power source 100 is supplied to the load 300 through the first filter 241, the first and second converters 210 and 220, and the second filter 242, and the compensated power is supplied to the load 300 through the third converter 230 and the fourth switch 254.

Figure 10:
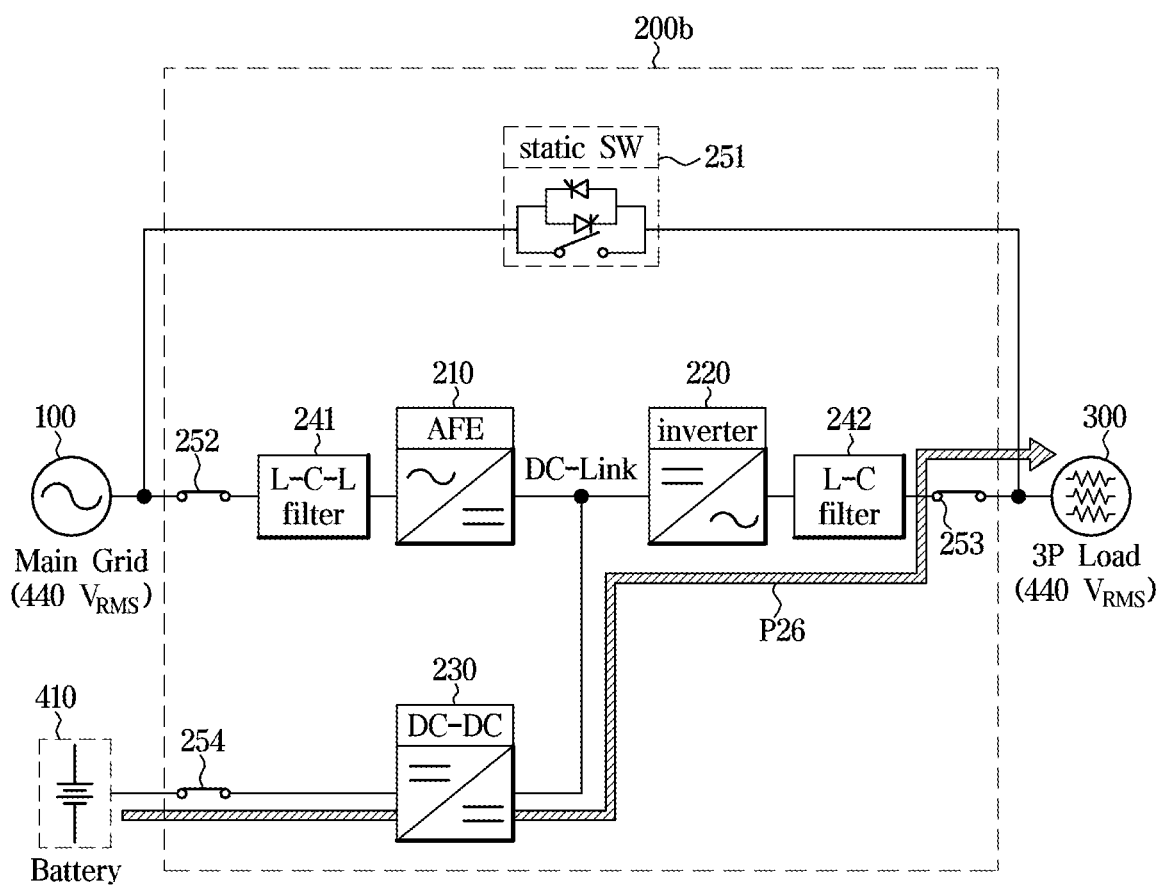

In other words, as shown in FIG. 10, the processor 265b determines the power quality based on the voltage signal of the voltage detector 262 and the current signal of the current detector 263 while supplying the power to the load through the power supply path P25 and forms a power supply path P26 connecting the battery 410, the third converter 230, the second converter 220, and the second filter 242 when it is determined that the state of the power input to the power management device is the voltage sag state or the voltage swell state according to the determination result. In this case, the processor 265b may supply the power to the load 300 through the two power supply paths having the parallel structure, that is, the power supply path P25 shown in FIG. 9 and the power supply path P26 shown in FIG. 10.

When it is determined that the state of the power input to the power management device is the voltage sag state while the power is supplied to the load through the power supply path P25, the processor 265b performs the compensation control for the voltage sag by controlling the operations of the second converters 220 and the third converter 230 to discharge the battery and performs the compensation control for the voltage swell by controlling the operations of the second converter 220 and the third converter 230 to charge the battery when it is determined that the state of the power input to the power management device is the voltage swell state.

The processor 265b re-determines the quality of the power input to the power management device 200a based on the voltage signal of the voltage detector 262 and the current signal of the current detector 263 while supplying the power of the power source 100 to the load 300 through the first filter 241, the first and second converters 210 and 220, and the second filter 242 and controls the turn-on of the first switch 251 and the turn-off of the second and third switches 252 and 253 when it is determined that the re-determined power quality is the target quality so that the power of the power source 100 is supplied to the load 300 through the first switch 251.

When it is determined that a fault of the first switch 251 of the power management device 200b has occurred while the echo compensation mode is performed, the processor 265b controls the turn-off of the first switch 251 and the turn-on of the second and third switches 252 and 253 so that the power of the power source 100 is supplied to the load 300 through the first filter 241, the first and second converters 210 and 220, and the second filter 242.

When it is determined that a fault of the first switch 251 of the power management device 200a has occurred while the echo compensation mode is performed, the processor 265b determines the power quality based on the voltage signal of the voltage detector 262 and the current signal of the current detector 263 and performs the compensation control in response to the determination result so that the power of the power source 100 is supplied to the load 300 through the first filter 241, the first and second converters 210 and 220, and the second filter 242.

The processor 265b may receive information on a current electric fee from the power source.

The processor 265b confirms the electric fee while performing the echo compensation mode, controls the turn-on of the third and fourth switches when it is determined that the confirmed electric fee is the maximum electric fee, and supplies the power of the battery to the load by controlling the operations of the second converter and the third converter.

The maximum electric fee is threshold information for determining the supply of power charged in the battery and may be preset information.

Figure 11:
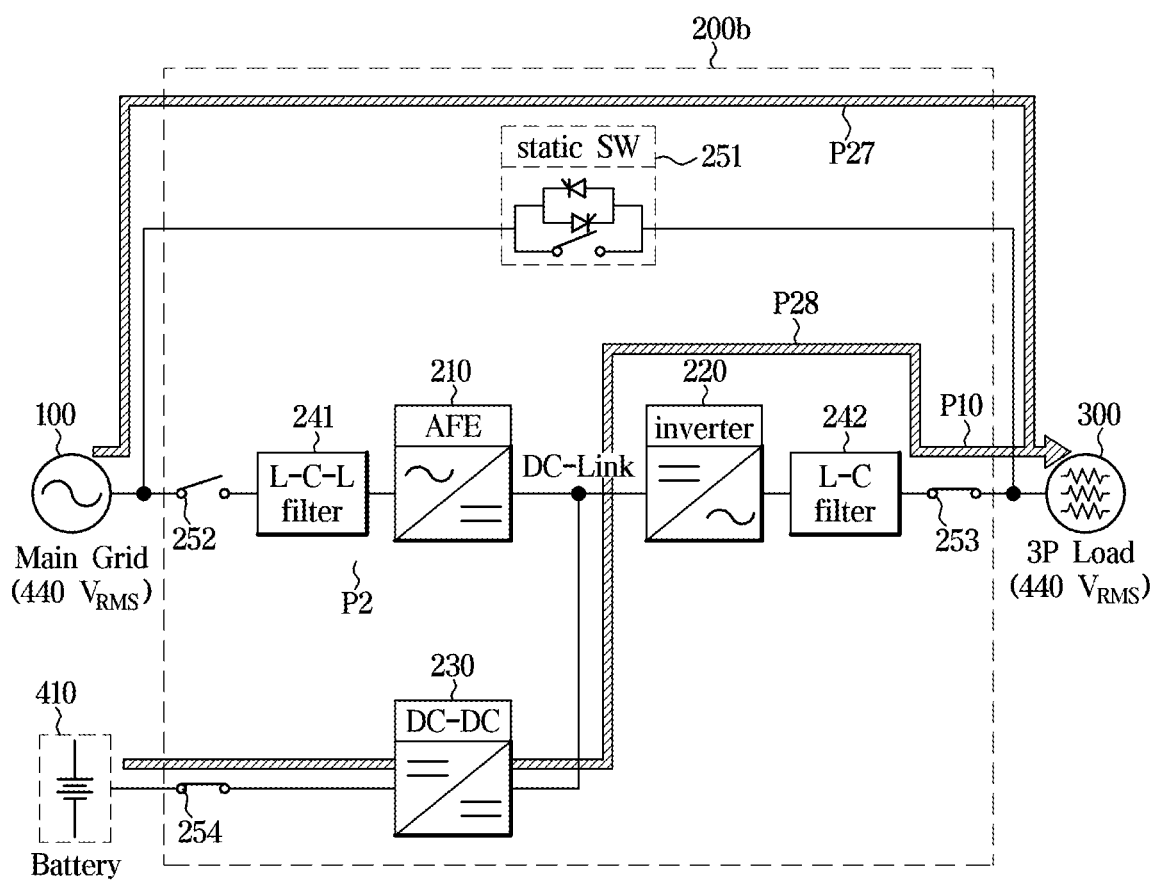

As shown in FIG. 11, the processor 265b may supply the power of the power source 100 to the load 300 through a power supply path P27 connecting the power source, the first switch, and the load by controlling the turn-on of the first switch 251 in response to the execution of the echo compensation mode and at the same time, supply the power of the battery 410 to the load 300 through a power supply path P28 connecting the battery 410, the third converter 230, the second converter 220, and the second filter 242 by controlling the turn-on of the third and fourth switches 253 and 254.

Therefore, the load may receive the required amount of power from the power source and the battery. In other words, the load may decrease the amount of power supplied from the power source at the time of having the maximum electric fee.

In addition, the processor 265b may confirm the electric fee, control the turn-on of the third and fourth switches when it is determined that the confirmed electric fee is the maximum electric fee, and supply only the power of the battery to the load 300 by controlling the operations of the second converter and the third converter.

The processor 265b may be implemented by a memory configured to store an algorithm for controlling the operations of the components in the power management device 200a or a program for reproducing the algorithm and a processor configured to perform the above-described operations using the data stored in the memory. In this case, the memory and the processor may be implemented as separate chips. Alternatively, the memory and the processor may also be implemented as a single chip.

The memory 266b stores reference information, such as a reference voltage value, a reference ratio range, and the first, second, third, and fourth reference ratios.

The memory 266b may be implemented as at least one of non-volatile memory devices, such as a cache, a ROM, a PROM, an EPROM, an EEPROM, and a flash memory, volatile memory devices, such as a RAM, and storage media, such as a HDD and a CD-ROM, but the present disclosure is not limited thereto.

Meanwhile, each component shown in FIG. 6 refers to software and/or hardware components, such as an FPGA and an ASIC.

At least one component may be added or deleted in response to the performance of the components of the power management device 200b shown in FIG. 6. In addition, it will be readily understood by those skilled in the art that the mutual positions of the components may be changed in response to the performance or structure of the system.

Figure 12:
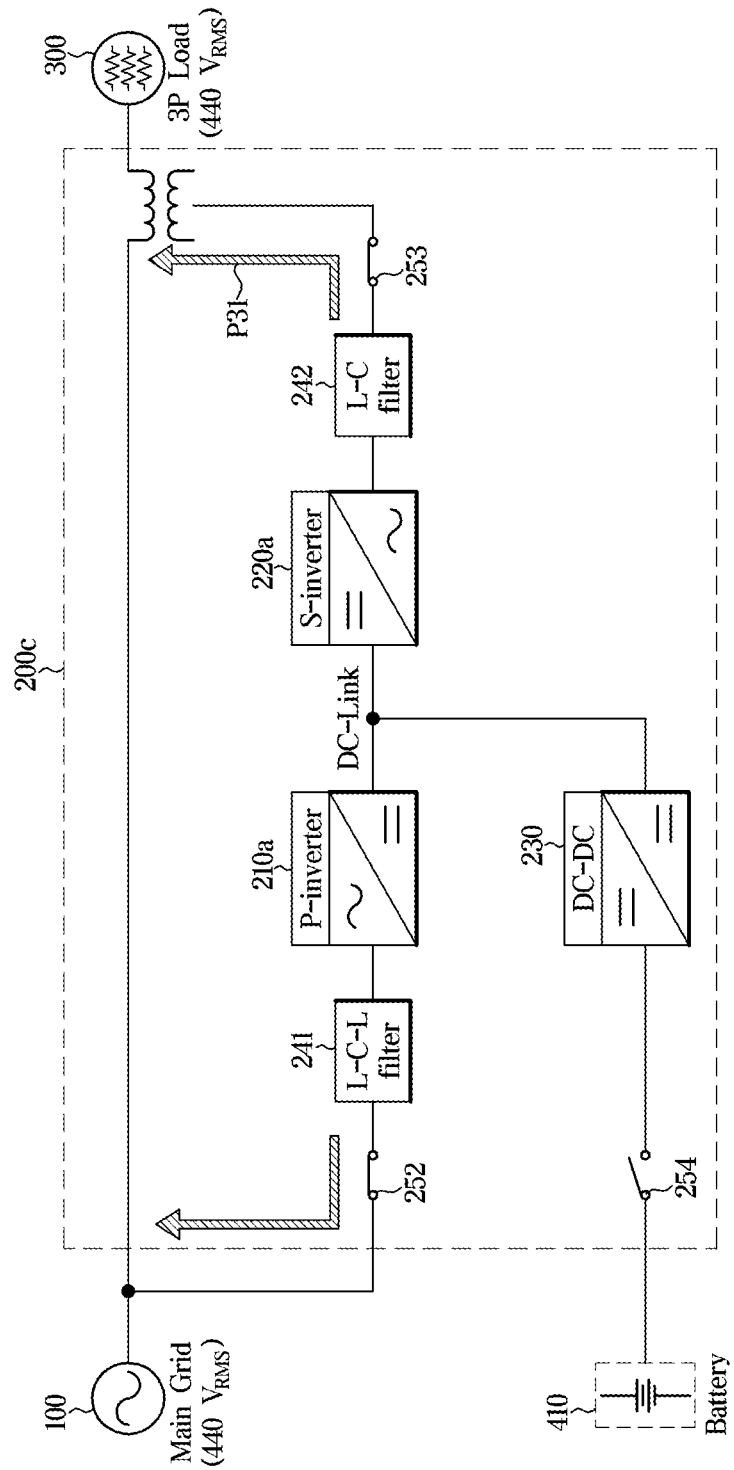
Figure 13:
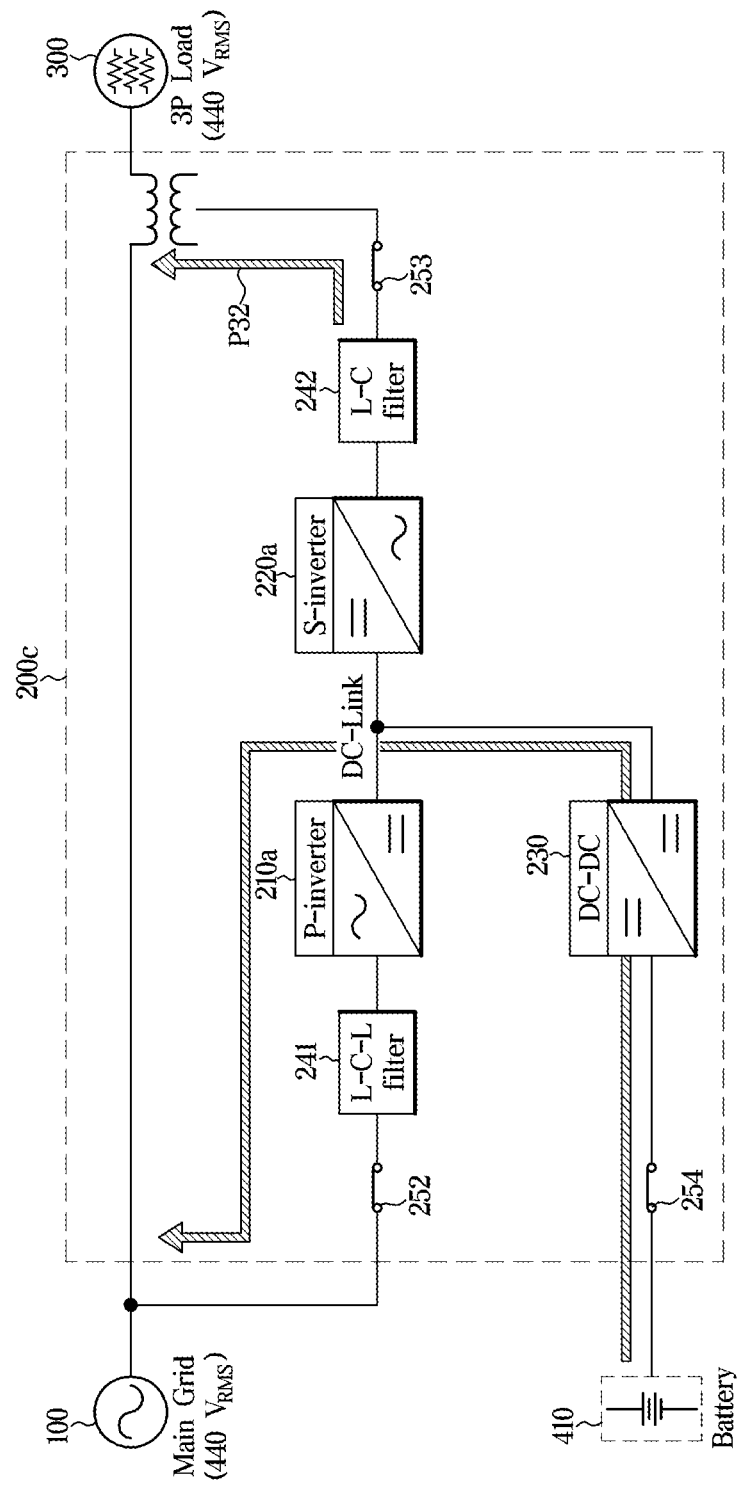

FIGS. 12 and 13 are configuration diagrams of a power management device.

A power management device 200c may include first, second, and third converters 210a, 220a, and 230, a first filter 241, a second filter 242, and a plurality of switches.

The first converter 210a may include a parallel inverter connected in parallel to a power source 100.

The first converter 210a may compensate for the PF.

The second converter 220a may include a series inverter connected in series to the first converter 210a.

The second converter 220a may compensate for a voltage sag, a voltage swell, harmonics, and a voltage imbalance.

The second converter 220a may compensate for a voltage sag state or a voltage swell state using a battery.

The plurality of switches may include second, third, and fourth switches 252, 253, and 254. Since the first and second filters and the second, third, and fourth switches are the same as the first and second filters and the second, third, and fourth switches shown in FIG. 6, descriptions thereof will be omitted.

As shown in FIG. 12, the power management device 200c may supply power with improved power quality to the load by controlling the first and second converters.

The power with improved power quality may be supplied to the load through a power supply path P31.

As shown in FIG. 12, the power management device 200c may control the turn-on of the second and third switches 252 and 253 and control the first and second converters 210a and 220a to supply the power with improved power quality to a load 300.

As shown in FIG. 13, the power management device 200c supplies the power of a battery 410 to the load 300 when it is determined that the electric fee is the maximum electric fee.

The power management device 200c may control the turn-on of the fourth switch 254 and control the operation of the third converter 230 to supply the power of the battery 410 with improved power quality to the load through a power supply path P32. At this time, the power management device 200c may also supply the power of the power source to the load together.

Meanwhile, the disclosed implementations may be implemented in the form of a recording medium configured to store instructions executable by a computer. The instructions may be stored in the form of program code and may perform the operations of the disclosed implementations by generating program modules when executed by a processor. The recording medium may be implemented as a computer-readable recording medium.

The computer-readable recording medium includes all types of recording media in which the instructions readable by the computer are stored. For example, there may be a ROM, a RAM, a magnetic tape, a magnetic disc, a flash memory, an optical data storage device, and the like.

According to one aspect of the present disclosure, power with improved power quality can be supplied to loads in response to an online compensation mode and power of a power source can be directly supplied to the loads in response to a fault state while the online compensation mode is performed, thereby preventing power supply from being cut off.

According to the present disclosure, the power of the power source can be directly supplied to the loads in response to an echo compensation mode, thereby minimizing power consumption by power conversion.

According to the present disclosure, compensation control can be performed when the power quality is abnormal while the echo compensation mode is performed and the power with improved power quality can be supplied to the loads, thereby preventing the power supply from being cut off and supplying high quality power, and thus it is possible to secure the reliability and stability of a power grid.

According to the present disclosure, the compensation for the power quality (sag, swell, harmonics, voltage imbalance, or power factor) can be performed, thereby preventing facilities and lines from being stopped, preventing a fault of the power management device, preventing a fault and malfunction of the load, preventing communication abnormality, and decreasing power loss.

According to the present disclosure, power can be stored in a battery at the time of the lowest electric fee, and the power stored in the battery can used at the time of a high electric fee, thereby securing the flexibility of power supply and decreasing an electric fee through a peak shift which decreases a difference of the electric fees over time and a peak cut which decreases a basic electric fee using the power of the battery at the time of the highest electric fee during the year.

According to the present disclosure, it is possible to compensate for the instability of renewable energy power generation and improve the reliability of the power supply.

According to the present disclosure, it is possible to improve the merchantability of the power management device, furthermore, increase a user's satisfaction, improve a user's reliability, and secure the competitiveness of a product.

What is claimed is:

1. A power management device comprising:
a first switch provided between a power source and a load;
a converter connected to the first switch in parallel and configured to convert a voltage and a current that are received from the power source;
a voltage detector configured to detect the voltage from the power source;
a current detector configured to detect the current from the power source; and
a processor configured to:
control power from the power source to be supplied to the load through the first switch by turning on the first switch in an echo compensation mode,
monitor power quality based on the detected current and the detected voltage,
perform, based on a determination that the power quality has been abnormal according to the monitored power quality, (i) compensation control through the converter in a turned-on state of the first switch or (ii) control of the power from the power source to be supplied to the load through the converter by turning off the first switch,
monitor harmonics, a power factor, and a voltage unbalance based on the detected current and the detected voltage, and
control the converter based on the monitored harmonics, power factor, and voltage unbalance.

2. The power management device of claim 1, further comprising:
a second switch connected between the power source and the converter; and
a third switch connected between the load and the converter,
wherein the converter includes (i) a first converter connected to the second switch and configured to convert the voltage and the current from the power source into a DC voltage and a DC current, respectively and (ii) a second converter provided between the first converter and the third switch and configured to convert the DC voltage and the DC current converted by the first converter into an AC voltage and an AC current, respectively.

3. The power management device of claim 2, wherein the processor is configured to:
control the power from the power source to be supplied to the load through the converter by turning off the first switch in an online compensation mode,
monitor the power quality based on the detected current and the detected voltage in the online compensation mode, and
perform the compensation control for the power quality based on the monitored power quality.

4. The power management device of claim 3, wherein the processor is configured to, based on a determination that a fault of at least one of the second and third switches or the first and second converters has occurred in the online compensation mode, control the power from the power source to be supplied to the load through the first switch by turning on the first switch.

5. The power management device of claim 2, wherein the processor is configured to:
monitor a voltage sag, a voltage swell, the voltage unbalance, the harmonics, and the power factor upon monitoring the power quality,
perform, based on a determination that the monitored power quality with respect to at least one of the harmonics, the voltage unbalance, or the power factor has been abnormal in the echo compensation mode, the compensation control through the first and second converters by turning on the second and third switches in the turned-on state of the first switch, and control, based on a determination that the monitored power quality with respect to the voltage sag or the voltage swell has been abnormal, the power from the power source to be supplied to the load through the first and second converters by turning off the first switch and turning on the second and third switches.

6. The power management device of claim 5, further comprising a DC link provided between the first converter and the second converter and including a capacitor, wherein the processor is configured to:

control, based on the abnormality of the power quality being the voltage sag, discharging of the capacitor, and control, based on the abnormality of the power quality being the voltage swell, charging of the capacitor.

7. The power management device of claim 2, further comprising:

a fourth switch connected to an energy storage system including a battery; and a third converter connected to the fourth switch, the first converter, and the second converter, wherein the processor is configured to:

control, based on a charged amount of the battery being less than a reference charged amount, the power from the power source to be supplied to the battery through the first converter and the third converter by turning on the fourth switch, and control, based on a current electric fee being a maximum electric fee, power from the battery to be supplied to the load through the third converter and the second converter by turning on the fourth switch.

8. The power management device of claim 7, wherein the processor is configured to:

control, based on the abnormality of the power quality being a voltage sag, the power from the battery to be supplied to the second converter by turning on the fourth switch, and control, based on the abnormality of the power quality being a voltage swell, power from the first converter to be supplied to the battery by turning on the fourth switch.

9. The power management device of claim 2, further comprising:

a first filter provided between the power source and the first converter and including an inductor-capacitor-inductor (LCL) filter; and a second filter that is provided between the second converter and the load and that includes an inductor-capacitor (LC) filter.

10. A power management device comprising:

an input device;

a first switch provided between a power source and a load;

a voltage detector configured to detect the voltage from the power source;

a current detector configured to detect the current from the power source;

a converter connected to the first switch in parallel and configured to convert a voltage and a current that are received from the power source; and a processor configured to:

control, based on a compensation mode received through the input device being an echo compensation mode, power from the power source to be supplied to the load through the first switch by turning on the first switch on, control, based on the compensation mode received through the input device being an online compensation mode, the power from the power source to be supplied to the load through the converter by turning off the first switch, monitor harmonics, a power factor, and a voltage unbalance based on the detected current and the detected voltage, and control the converter based on the monitored harmonics, power factor, and voltage unbalance.

11. The power management device of claim 10, wherein the processor is configured to:

monitor power quality based on the detected current and the detected voltage in the echo compensation mode, and perform, based on a determination that the power quality has been abnormal according to the monitored power quality, (i) compensation control through the converter in a turned-on state of the first switch or (ii) control of the power from the power source to be supplied to the load through the converter by turning off the first switch.

12. The power management device of claim 11, further comprising:

a second switch provided between the power source and the converter;

a third switch provided between the converter and the load;

a first filter connected to the second switch and including an inductor-capacitor-inductor (LCL) filter; and a second filter that is connected to the third switch and that includes an inductor-capacitor (LC) filter, wherein the converter includes (i) a first converter connected to the second switch and configured to convert the voltage and the current from the power source into a DC voltage and a DC current, respectively and (ii) a second converter provided between the first converter and the third switch and configured to convert the DC voltage and the DC current converted by the first converter into an AC voltage and an AC current, respectively.

13. The power management device of claim 12, wherein the processor is configured to monitor the power quality based on the detected current and the detected voltage and perform the compensation control based on the monitored power quality.

14. The power management device of claim 13, wherein the processor is configured to, based on a determination that at least one of the second and third switches or the first and second converters is in a fault state in the online compensation mode, control the power from the power source to be supplied to the load through the first switch by turning on the first switch.

15. The power management device of claim 12, further comprising:

a fourth switch connected to an energy storage system including a battery; and a third converter connected to the fourth switch, the first converter, and the second converter, wherein the processor is configured to:

control, based on a charged amount of the battery being less than a reference charged amount, the power from the power source to be supplied to the battery through the first converter and the third converter by turning on the fourth switch, and control, based on a current electric fee being a maximum electric fee, power from the battery to be supplied to the load through the third converter and the second converter by turning on the fourth switch.

16. The power management device of claim 15, wherein the processor is configured to:

control, based on the abnormality of the power quality being a voltage sag, the power from the battery to be supplied to the second converter by turning on the fourth switch, and control, based on the abnormality of the power quality being a voltage swell, power from the first converter to be supplied to the battery by turning on the fourth switch.

17. A power management device comprising:

a converter connected to a power source and configured to convert a voltage and a current that are received from the power source;

a switch connected to an energy storage system including a battery;

a voltage detector configured to detect the voltage from the power source;

a current detector configured to detect the current from the power source; and a processor configured to:

determine whether a state of the power input to the power management device is a voltage sag state or a voltage swell state based on the detected voltage, control, based on a determination that the state of the power input to the power management device is the voltage sag state, power from the battery to be supplied to the converter by turning on the switch, control, based on a determination that the state of the power input to the power management device being the voltage swell state, power from the power source to be supplied to the battery through the converter by turning on the switch, monitor harmonics, a power factor, and a voltage unbalance based on the detected current and the detected voltage, and control the converter based on the monitored harmonics, power factor, and voltage unbalance.

18. The power management device of claim 17, wherein the processor is configured to:

control, based on a charged amount of the battery being less than a reference charged amount, the power from the power source to be supplied to the battery through the converter by turning on the switch, and control, based on a current electric fee being a maximum electric fee, the power from the battery to be supplied to the converter by turning on the switch.

19. The power management device of claim 17, further comprising:

a first switch provided between the power source and a load and connected to the converter in parallel;

a first filter provided between the power source and the converter and including an inductor-capacitor-inductor (LCL) filter;

a second filter that is provided between the converter and the load and that includes an inductor-capacitor (LC) filter;

a second switch provided between the first filter and the converter; and a third switch provided between the second filter and the load, wherein the power from the power source is supplied to the load through the first switch based on the first switch being turned on, and the power from the power source is supplied to the load through a path connecting the second switch, the first filter, the converter, the second filter, and the third switch based on the first switch being turned off.

* * * * *